(12) United States Patent
Rioux et al.

(10) Patent No.: US 6,296,073 B1
(45) Date of Patent: Oct. 2, 2001

(54) ALL TERRAIN VEHICLE WITH IMPROVED MOTOR ARRANGEMENT

(75) Inventors: Roger Rioux; Claude Gagnon, both of Magog (CA); Johann Holzleitner, Welser Strasse (AT)

(73) Assignee: Bombardier Inc., Montreal (CA)

( * ) Notice: Subject to any disclaimer, the term of this patent is extended or adjusted under 35 U.S.C. 154(b) by 0 days.

(21) Appl. No.: 09/338,749

(22) Filed: Jun. 23, 1999

(51) Int. Cl.[7] ..................................................... B60K 5/02
(52) U.S. Cl. ................. 180/292; 180/89.17; 180/233; 180/247; 180/291; 180/376; 74/606 R; 74/595; 188/79.57
(58) Field of Search .................... 180/291, 292, 180/69.4, 69.2, 233, 252, 248, 376, 89.13–89.19, 247; 188/79.57, 79.55, 79.61; 74/606 R, 595

(56) References Cited

U.S. PATENT DOCUMENTS

| | | | |
|---|---|---|---|
| 1,210,754 | * | 1/1917 | Beatty .................................. 180/247 |
| 4,602,696 | * | 7/1986 | Taga et al. ........................... 180/247 |
| 4,606,429 | * | 8/1986 | Kurata ................................. 180/292 |
| 4,666,015 | * | 5/1987 | Matsuda et al. ..................... 180/233 |
| 4,699,234 | * | 10/1987 | Shinozaki et al. .................. 180/233 |
| 4,704,920 | * | 11/1987 | Kurata ............................. 74/665 GC |
| 4,714,126 | * | 12/1987 | Shinozaki et al. ................... 180/233 |
| 4,723,624 | * | 2/1988 | Kawasaki et al. .................... 180/247 |
| 4,876,991 | * | 10/1989 | Galitello, Jr. ....................... 123/46 E |
| 5,005,662 | * | 4/1991 | Kodama ................................ 180/247 |
| 5,044,458 | * | 9/1991 | Schwarz et al. ...................... 180/247 |
| 5,305,848 | * | 4/1994 | Akutagawa et al. ................. 180/292 |
| 5,323,870 | * | 6/1994 | Parigger et al. ..................... 180/247 |
| 5,332,060 | * | 7/1994 | Sperduti et al. ..................... 180/247 |
| 5,335,641 | * | 8/1994 | Schnabel .............................. 123/574 |
| 5,505,278 | * | 4/1996 | Smith .................................. 180/246 |
| 5,740,878 | * | 4/1998 | Sala .................................... 180/291 |
| 6,029,638 | * | 2/2000 | Funai et al. ......................... 123/572 |

* cited by examiner

Primary Examiner—Brian L Johnson
Assistant Examiner—Deanna Draper
(74) Attorney, Agent, or Firm—Pillsbury Winthrop LLP

(57) ABSTRACT

An all terrain vehicle comprises an engine located under a hingably mounted seat, the seat providing ready access to the engine for maintenance and repair. The engine is placed in the vehicle such that the crankshaft is parallel to the line of travel and the crankshaft is in line with the longitudinal axis of the vehicle. The engine has two output shafts. The front output shaft extends forwardly of the engine to a front differential on the front axle and the rear output shaft extends rearwardly to a rear differential on the rear axle. The front and rear output shafts are in communication with one another by gears which enables different ratios of revolution between-the front and rear axle. The all terrain vehicle is also equipped with a parking gear which locks the two output shafts and prevents rotation with respect to the transmission housing.

20 Claims, 21 Drawing Sheets

ALL TERRAIN VEHICLE WITH IMPROVED MOTOR ARRANGEMENT

BACKGROUND OF THE INVENTION

1. Field of the Invention

This invention relates to an all terrain vehicle and more particularly to the placement and orientation of the engine and type of engine and power train.

2. Description of Related Art

All terrain vehicles have become quite popular in Canada and the United States in recent years. The original vehicles were built with three wheels and had a chain drive. Motors were generally oriented in the vehicle, having the crankshaft and drive shafts oriented transversally to the direction of travel. Such vehicles were found to be unsteady and did not have sufficient stability and power to work as utility vehicles.

In more recent years, all terrain vehicles have been developed with four wheels for greater stability and in fact four wheel drive. Generally, the orientation of the motor was such that the crankshaft and drive shafts extended transversally to the line of travel and chain drives or other gear mechanisms were used to drive front and rear axles.

In very recent times, some manufactures have oriented the engine such that the crankshaft is parallel to the line of travel and the longitudinal axis of the vehicle. In fact, some vehicles have a single output or drive shaft which extends through the motor and drives transmissions on the front and rear axles. Being a single shaft of course the gear ratio is identical between a front portion of the single output or drive shaft and a rear portion of the single output or drive shaft.

Other problems with recent all terrain vehicles is the failure to provide access to the engine for maintenance and repair. It is difficult to access things such as the oil filter, engine oil filler cap or remove the cylinder head. Therefore, there is a need to have a vehicle with ready access to the engine.

Another problem with recently manufactured all terrain vehicles is that the engine is too high and takes up too much space. Therefore a new more compact engine is desirable. Another problem with present day engines is failure to have a parking gear. The parking gear is desirable when one wishes to keep the engine on or park on a steep slope. It is also desirable to have engine placement in such a way so that the vehicle can be easily mounted by the operator without stepping over a high straddle seat. Thus there is a need to position the engine such that one may step through to mount the saddle or seat.

SUMMARY OF THE INVENTION

The present invention provides a motor which is mounted in the vehicle under the seat. The vehicle has a step through passageway in front of the seat. The motor provides drive to the rear axle and front axle by means of two output shafts. The output shafts are connected to one another in a type of split shaft arrangement. Gears transfer power from the crankshaft to the transmission. Thereafter power is transferred to one output shaft and thereafter to the second output shaft. Each output shaft, i.e. the rear and the front, are directly in line with the differential gears on the rear and front axles respectively. Thus there is an ease of manufacture.

The transmission of the vehicle of the present invention consists basically of intermediate shafts and two transmissions. A parking gear is also provided to lock the two output shafts and prevents rotation with respect to the transmission housing.

The engine is located under the seat, while the gas tank is located just below the steering counsel. The seat is hinged and provides easy access to the engine. Since there is no fuel tank on top of the cylinder head it is easy to remove the cylinder head for maintenance or repair.

In the present invention the transmission is integrated into the crankcase of the motor. Positioning the crankshaft, balancer shaft and cam shaft roughly in the same area (although not on the same plane), the lowest overall height of the engine is obtained. The engine of the present invention has a two valve design. It is a four cycle engine with one cylinder. Two spark plugs are used.

An oil filler cap for the engine is located directly on top of the valve cover. Thus engine oil for the crankcase can be added with easy access. The oil sieve which is located on the bottom of the crankcase has an access cover and the oil sieve can be removed easily and cleaned.

The crankshaft of the present invention is connected to a centrifugal clutch. This is located forward of the crankcase between the clutch housing and the crankcase housing. Forward of the clutch housing is a clutch cover. A disengaging piston is found between the clutch housing and clutch cover. The all terrain vehicle uses a two clutch system which is well known in the art.

The present invention also has a parking gear. To the best of the inventors' knowledge a parking gear has never been used before in an all terrain vehicle.

The transmission used in the all terrain vehicle of the present invention is located within the crankcase housing.

The water pump used for the engine coolant in the present invention is novelly positioned at the end of the crankshaft at the rear end of the crankcase housing. No other all terrain vehicle places the water pump directly on the crankshaft itself.

The radiator for the water cooled system is at the rear of the engine close to the water pump. The radiator also has a fan which is located at the rear of the vehicle's engine.

The fuel tank has a low center of gravity and is positioned ahead of the engine. With regard to the air intake for the engine, it enters near the front of vehicle at the highest point to avoid water or mud entering the air intake. From there the air goes to an air box which houses an air filter and a silencer. Thereafter, the air is directed to the carburetor. The carburetor of the present all terrain vehicle is a standard carburetor.

The clutch housing and cover of the present invention is equipped with water coolant passages in the bottom. Water is routed through the bottom of the engine to cool the oil in the housing above. This is unique to all motor vehicle engines.

Therefore this invention seeks to provide an all terrain vehicle including a four cycle engine and a power train; said engine including a crankshaft; said engine being mounted in said vehicle such that said crankshaft is parallel to a longitudinal axis of said vehicle and parallel to a line of travel when said vehicle is in motion; said engine further including a rear output shaft and a front output shaft, said shafts being parallel to said crankshaft; wherein said rear output shaft in operation is adapted to supply power to a rear axle and said front output shaft is adapted to supply power to a front axle.

BRIEF DESCRIPTION OF THE DRAWINGS

The invention will be described more fully in connection with the following drawings wherein.

DETAILED DESCRIPTION OF ILLUSTRATED EMBODIMENTS

Figure 1:
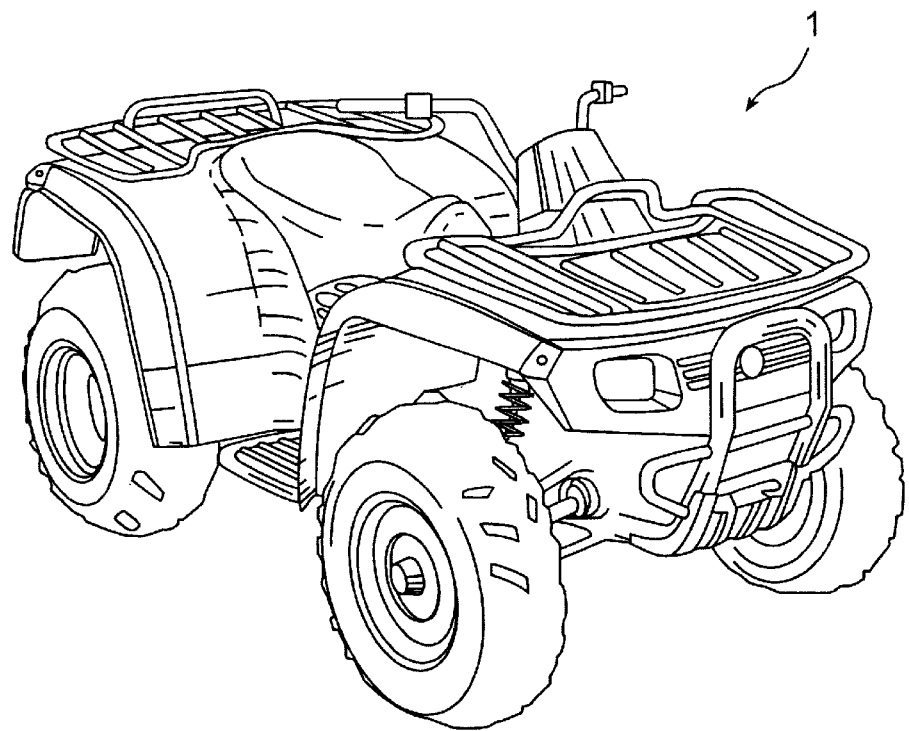
FIG. 1 is a perspective view of the all terrain vehicle of the present invention.
Figure 2:
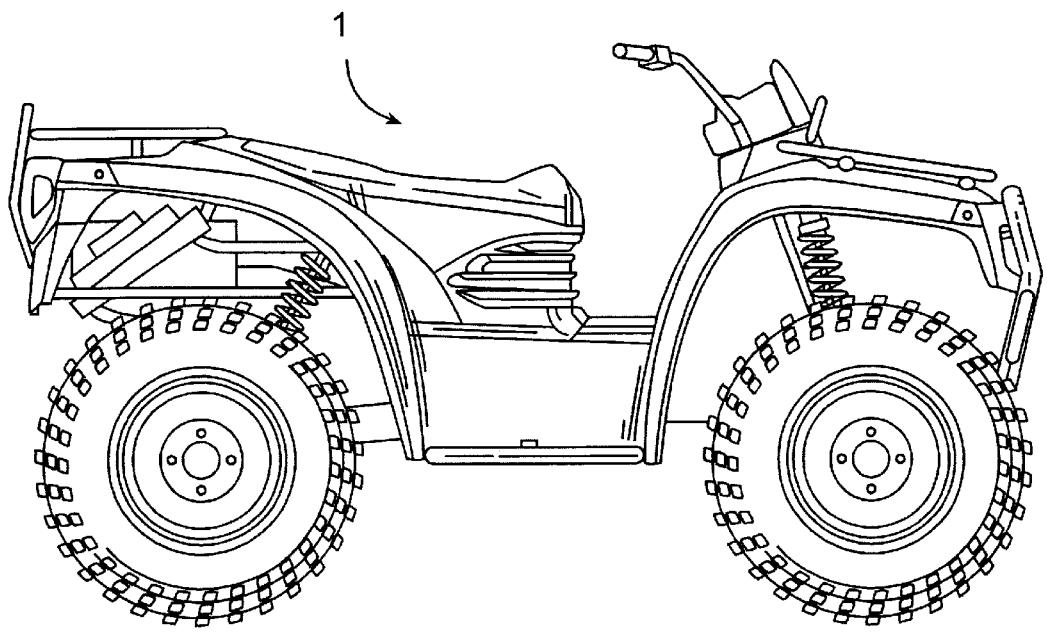
FIG. 2 is a side view of the vehicle of the present invention.
Figure 3:
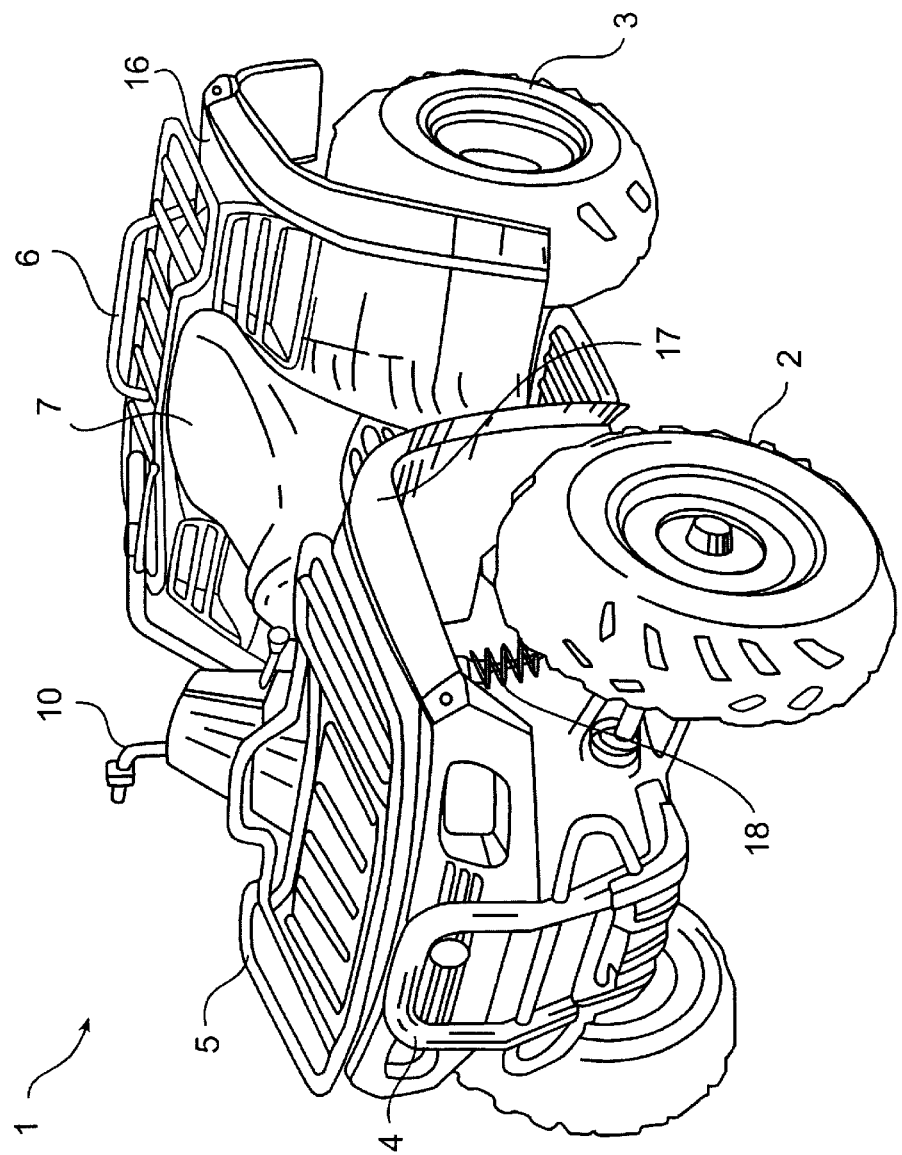
FIG. 3 is another perspective view of the present invention showing some of the exterior components.
Figure 7:
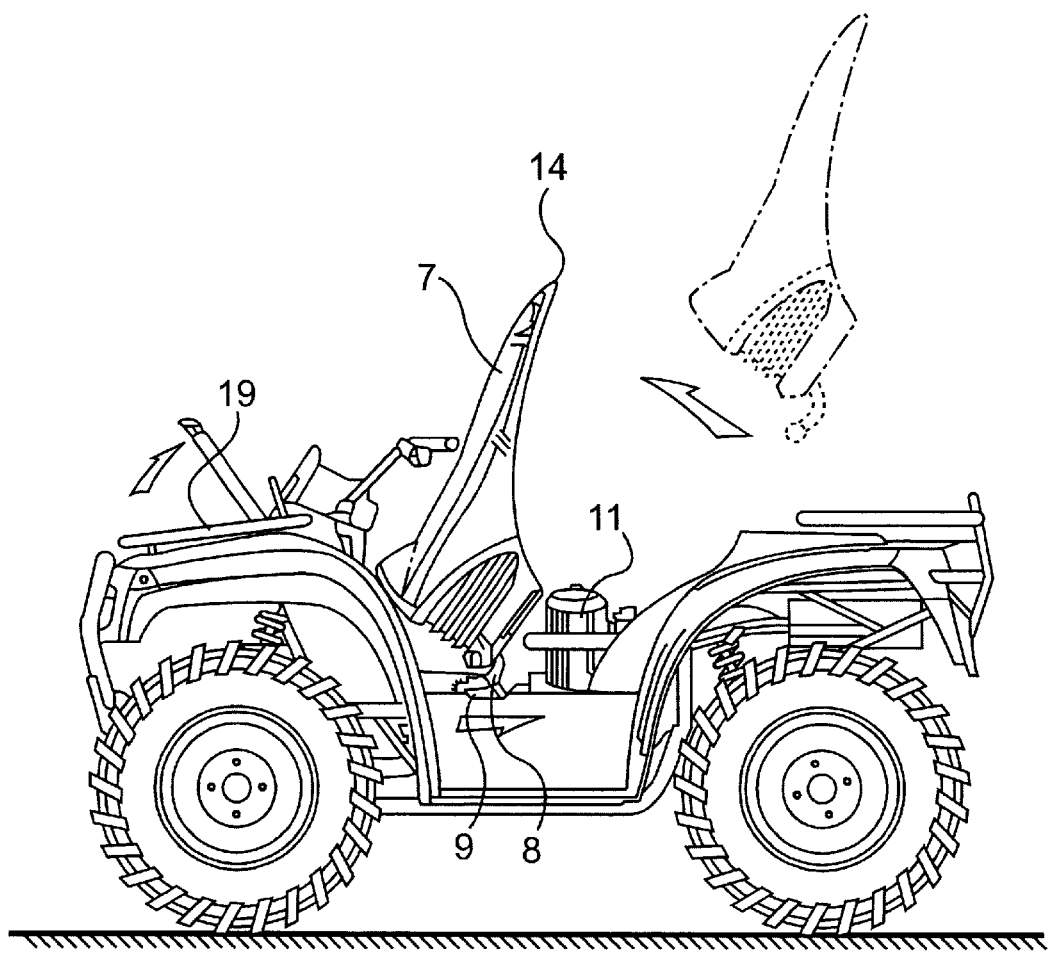
FIG. 7 is a side view of the present invention showing the seat in an open position for servicing of the motor.

FIGS. 1, 2 and 3 show various views of an all terrain vehicle 1 of the present invention. Referring more particularly to FIG. 3, the vehicle 1 has a pair of front wheels 2 and a pair of rear wheels 3. There is a front bumper 4, a front carriage rack 5, a rear carriage rack 6. There is a seat 7 which is positioned over the engine and is hingably mounted. As seen in FIG. 7, there is a hinge bracket 8 which hinges about pivot hinge 9.

The all terrain vehicle is equipped with a pair of handle bars 10.

Figure 4:
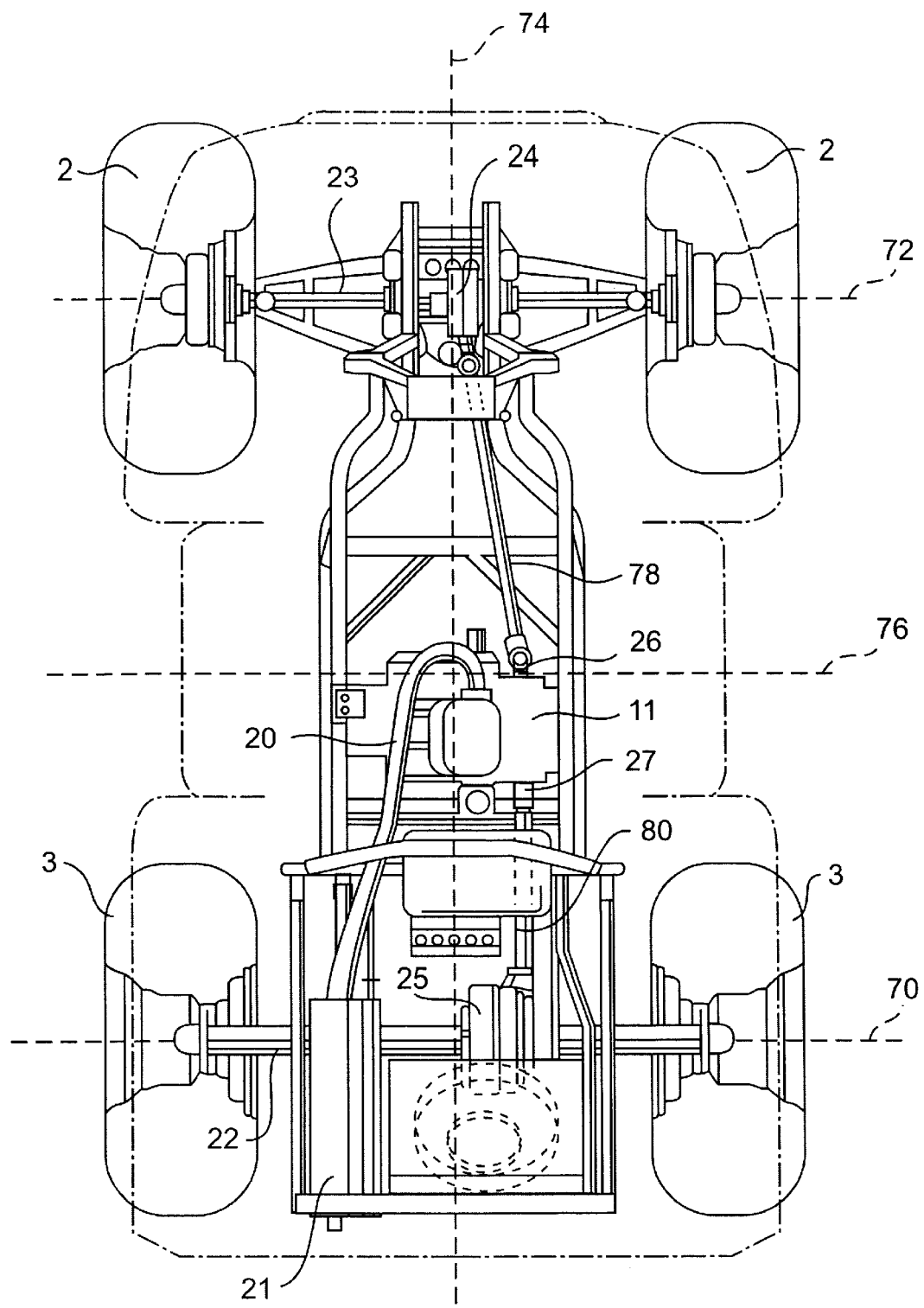
FIG. 4 is an underside view of the present invention shown in a schematic fashion.
Figure 5:
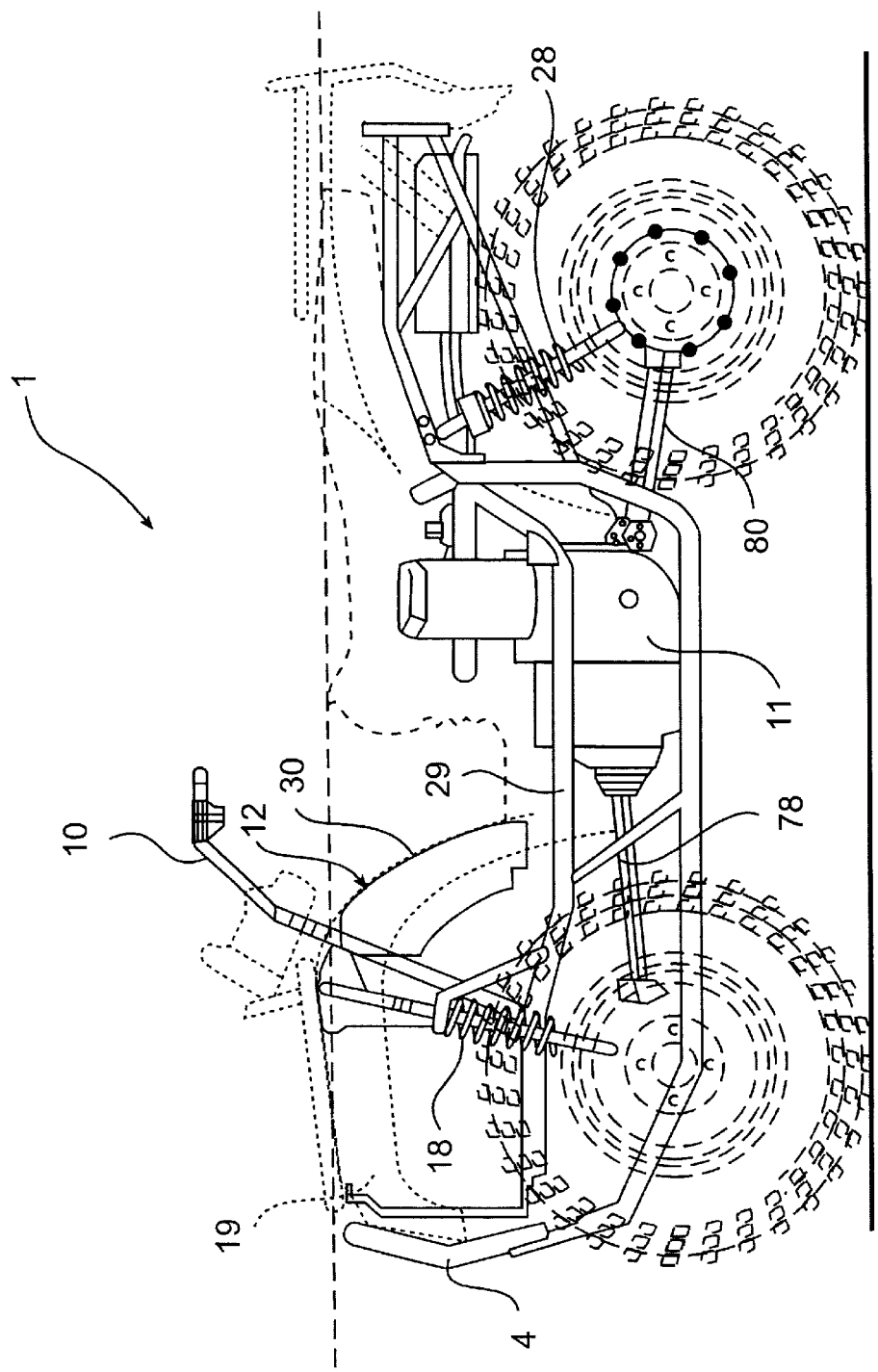
FIG. 5 is a side view of the present invention showing some of the internal working components; the actual outline of the body and seat of the invention is shown in dotted lines.
Figure 6:
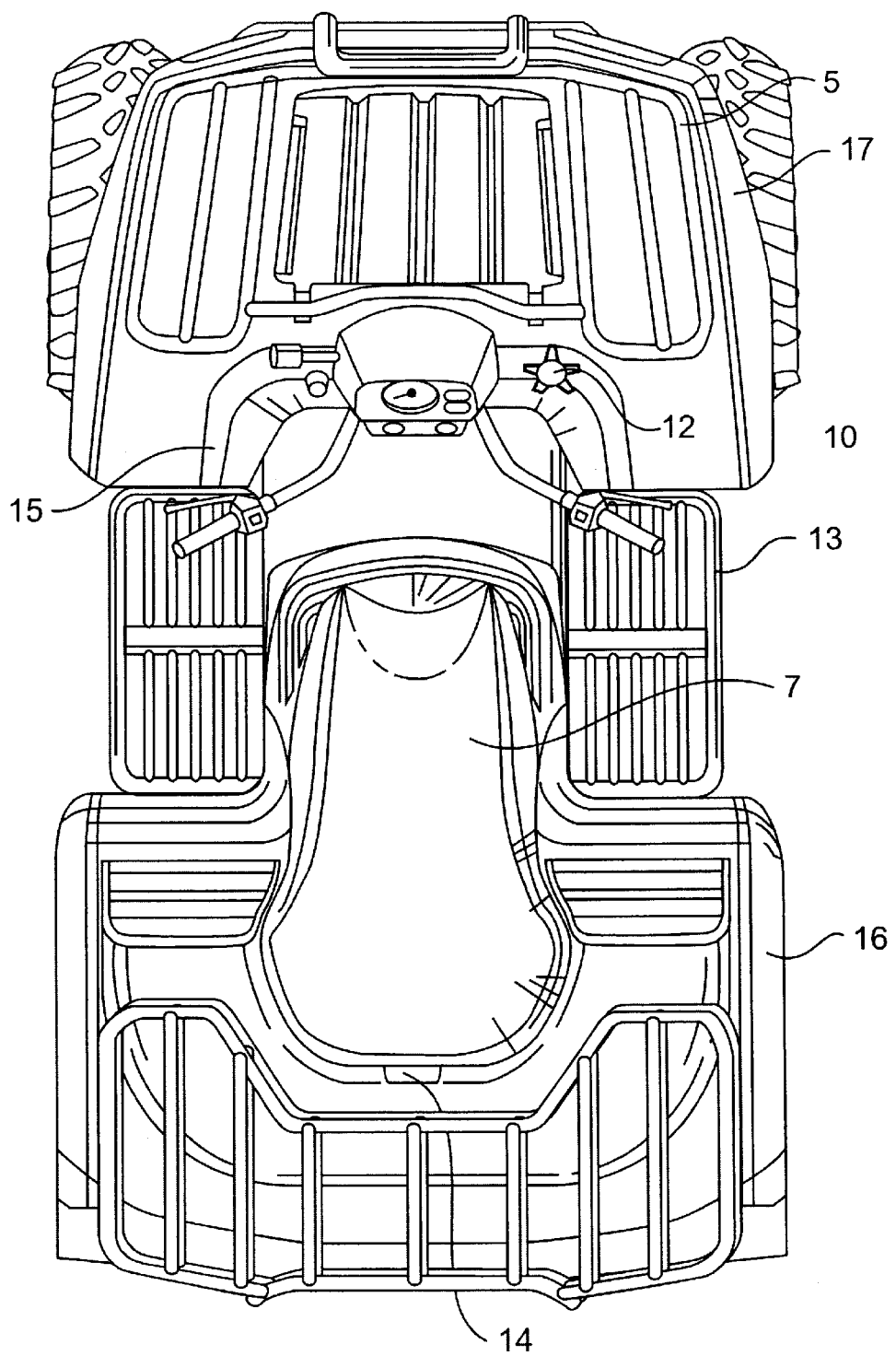
FIG. 6 is a top view of the present invention with the body components thereon.

Turning to FIGS. 4 and 5 one notes that there is an engine 11. As shown in FIG. 5, the gas tank 30 is mounted below the handle bars. Gas cap 12 closes the tank. As seen from the FIG. 6, foot rests 13 are found on either side of the seat 7. Also visible in FIG. 6 is that seat 7 has a seat latch 14 which can be lifted upwardly for access to the motor 11. As seen is FIG. 6 there is an instrument dash 15 located below the handle bars 10. The rear of the body of the vehicle forms rear wheel wells 16 and the front of the body forms front wheel wells 17. In FIG. 3 one of the front shocks 18 is visible.

The all terrain vehicle of the present invention is equipped with a front compartment 19. In FIG. 7 one views that the cover of the front compartment is open. The compartment can be used for storage of various items.

In FIG. 4 one sees an exhaust pipe 20 leading from the motor 11 to a muffler 21. Also viewed in FIG. 4 is a rear axle 22 that defines a rear axle axis 70 and a front axle 23 that defines a front axle axis 72. A rear differential 25 is located on the rear axle 22 and a front differential 24 is located on the front axle 23. A front drive shaft 78 is pivotally connected between a front output shaft 26 of the motor 11 and the front differential 24. A rear drive shaft 80 is similarly connected between a rear output shaft 27 of the motor 11 and the rear differential 25. It is to be noted that because of the orientation of the motor 11 with the crankshaft being parallel to a longitudinal axis 74 of the vehicle, the two output shafts 26, 27 are also substantially parallel to the crankshaft and the line of travel. The vehicle also includes a central transverse axis 76 extending transverse to the longitudinal axis 74, the central transverse axis 76 defining a front portion of the vehicle and a rear portion of the vehicle. The motor 11, or engine, is substantially located in the rear portion of the vehicle between the central transverse axis 76 and the rear axle axis 70. As visible in FIG. 5 the vehicle is also equipped with rear shock absorbers 28. The frame is generally shown as 29 in drawings 1 through 10.

Figure 8:
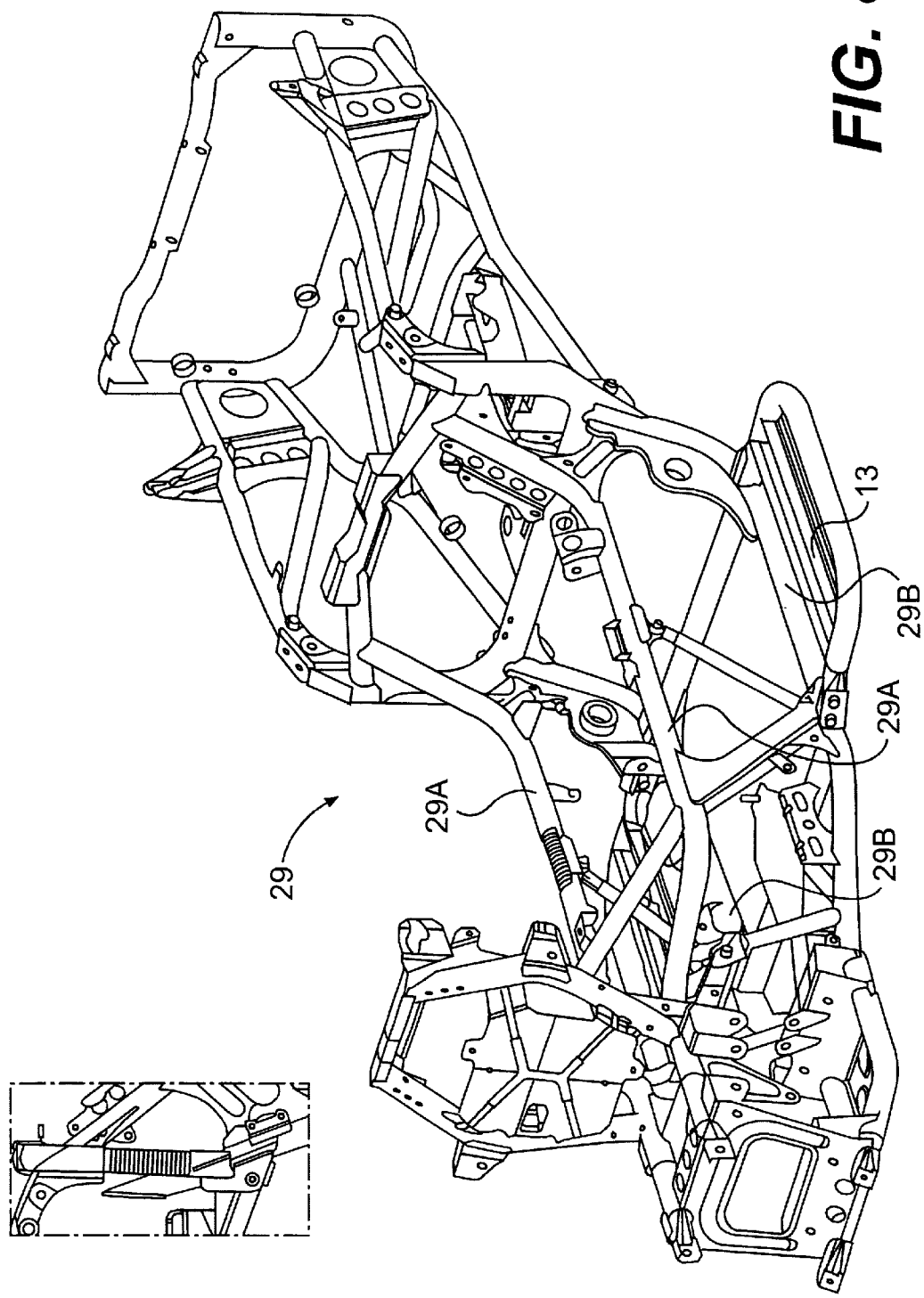
FIG. 8 is a view of the basic frame of the present invention without body, motor, suspension or other components.

In FIG. 8 the frame 29 is shown without any other components. Step 13 has been marked as it forms part of the basic tubular type frame. It is to be understood in FIG. 8 that the frame is lower in the mid-section to allow for the step through feature which is an important part of the improved all terrain vehicle.

Figure 9:
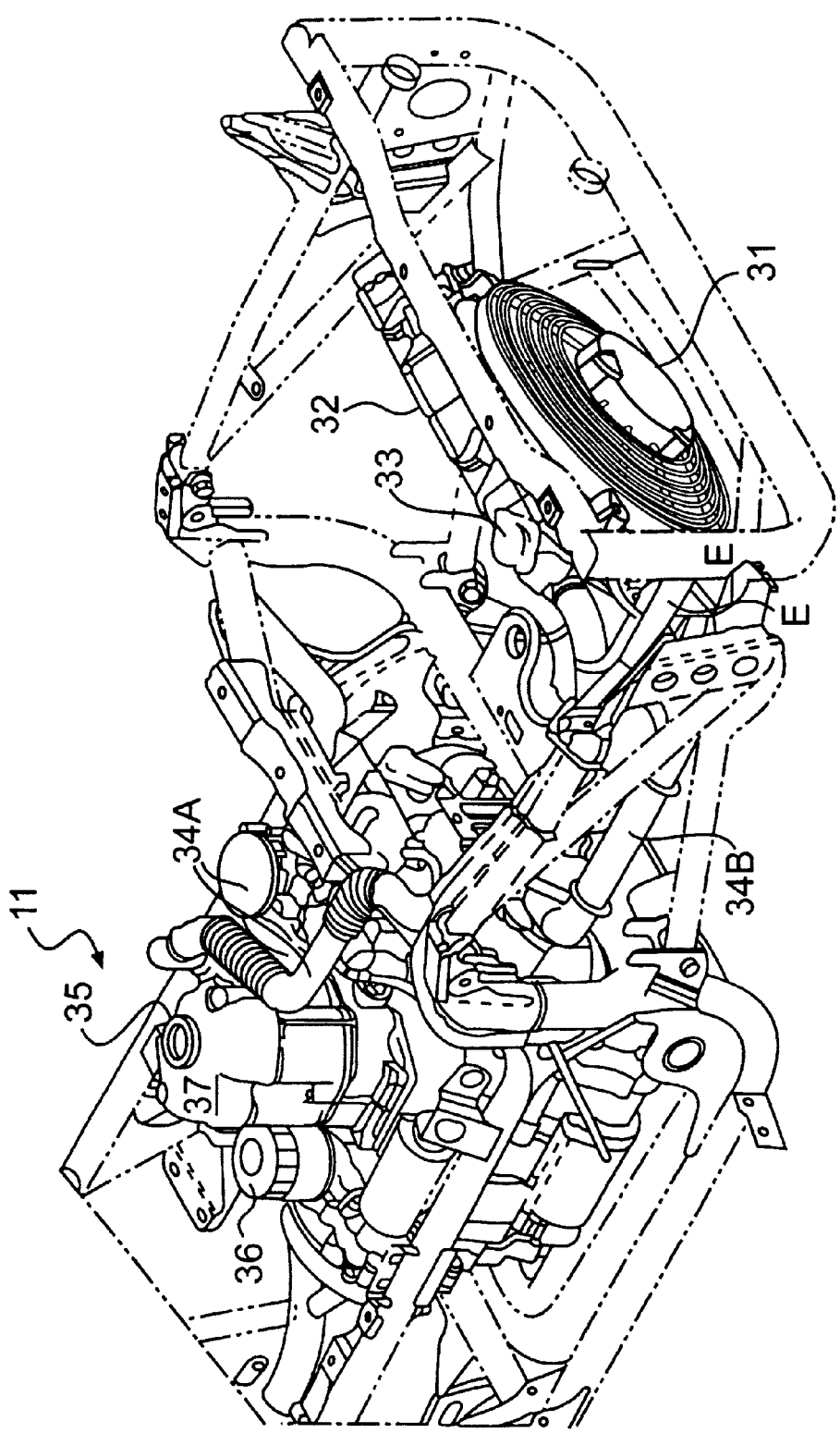
FIG. 9 is a perspective view of the motor mounted on the frame shown in FIG. 8.

FIG. 9 is a perspective view of the mid and rear portions of the tubular frame or chassis of the vehicle with the motor 11 mounted therein. To the rear of the frame is mounted fan 31, and a radiator 32. A radiator cap 33 is visible. Radiator inlet hose 34A leads from the water manifold of the engine 1 1 to the radiator 32. Radiator outlet hose 34B subsequently leaves the bottom portion of the radiator 32 and travels to the engine 11 where it is fixedly connected.

Figure 10:
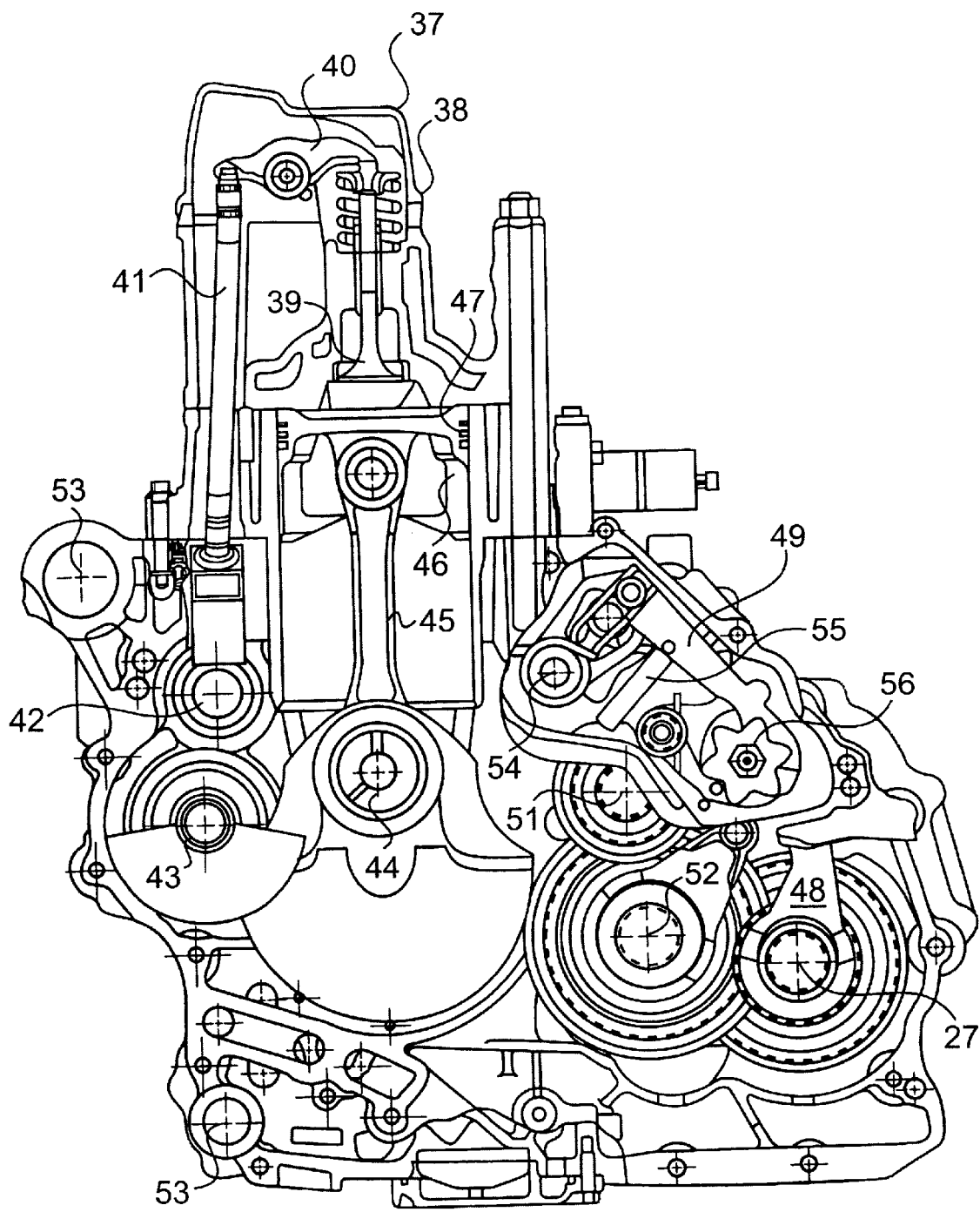
FIG. 10 is a transverse cross section of the engine of the present invention.

Unlike other all terrain vehicles where the engine compartment is difficult to get access to, the hinged seat 7 of the present invention provides ready access. Furthermore, the crankcase oil filler opening is found at the top of the valve cover 37 and is covered by a oil filler cap 35. Because the gas tank 30 is distant from the engine 11 rather than being located on top of the engine as is in so many cases, particulary in motorcycles, the cylinder head can be readily accessed for repair. Also in FIG. 9 the oil filter 36 is visible and similarly easily accessible. FIG. 10 is a transverse section through the engine itself. As was previously mentioned the engine is positioned on the all terrain vehicle such that the crankshaft 44 is parallel with the longitudinal axis of the vehicle and runs from front to back. The rear output shaft 27 is visible in this particular section however the front output shaft 26 is not visible. Below the valve cover 37, one sees a valve spring 38 around valve 39. The engine of the present invention is equipped with two inlet valves 39. The single cylinder and piston motor of the present invention also uses two spark plugs for the single cylinder.

A rocker arm 40 is pivotally connected to a push rod 41 which in turn is moved upwardly and downwardly by a cam shaft 42. Push rod 41 causes the opposite end of the rocker arm to move upwardly and downwardly in accordance with movement of the cam shaft 42 to open and close the valves 39 accordingly.

The cam shaft 42 is positioned above the balance shaft 43 which is located just to one side of the main crankshaft 44. From crankshaft 44 is a pivotal connection to connecting rod 45 which connects to piston 46. Piston 46 moves upwardly and downwardly within cylinder 47. Transmission shift forks 48 are visible on rear output shaft 27 and main shaft 52. Above main shaft 52 is countershaft 51.

A pawl assembly 49 functions as a parking brake. The parking brake secures front output shaft 26 and rear output shaft 27 from rotation with respect to the transmission housing and locks the vehicle in a park position. Front output shaft 26 is not visible in FIG. 10.

Figure 13:
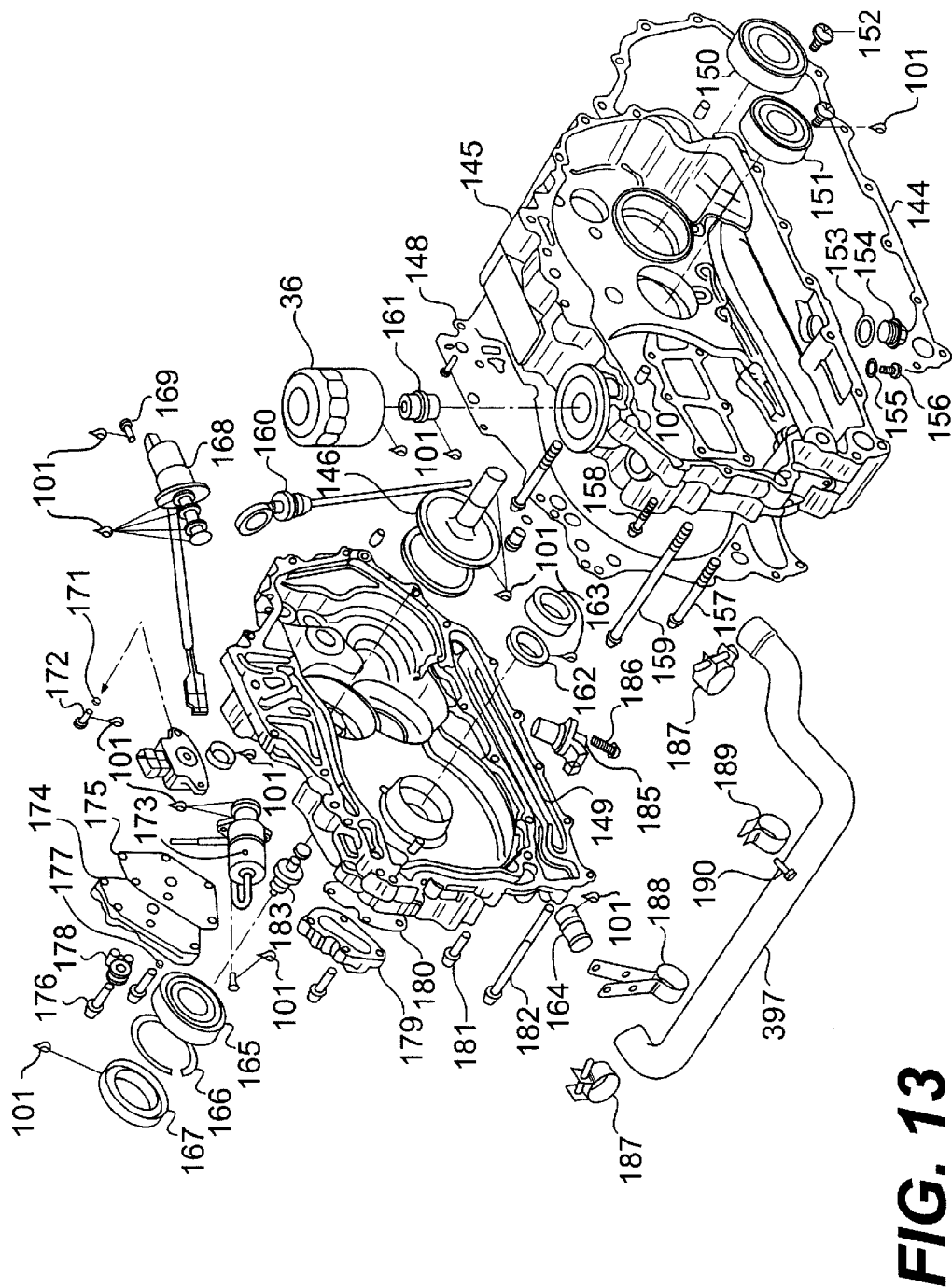
FIG. 13 is an exploded view of the components of the clutch housing and clutch cover.

Motor countershaft 51 is located above the main shaft and parallel thereto. Mounting points 53 are also shown. The mounting points 53 are adapted to be mounted on a plurality of engine mounting points on the upper and lower support members 29a and 29b of the frame 29, as shown in FIG. 8. The mounting points 53 are positioned on the crankcase, as shown in FIG. 10. FIG. 13 shows the crankcase components (e.g., the clutch cover and housing) in an exploded view. One advantage to this structure is that it allows pivotable mounting of the seat 7 (FIG. 7), and when in the open position, the seat allows free access to the engine components of the engine. Also shown in FIG. 10 is the shift shaft 54, tension spring 55 and shift drum assembly 56. The pawl assembly 49, tension spring 55, shift shaft 54 and shift drum assembly 56 are components of the gear shifter.

Figure 11:
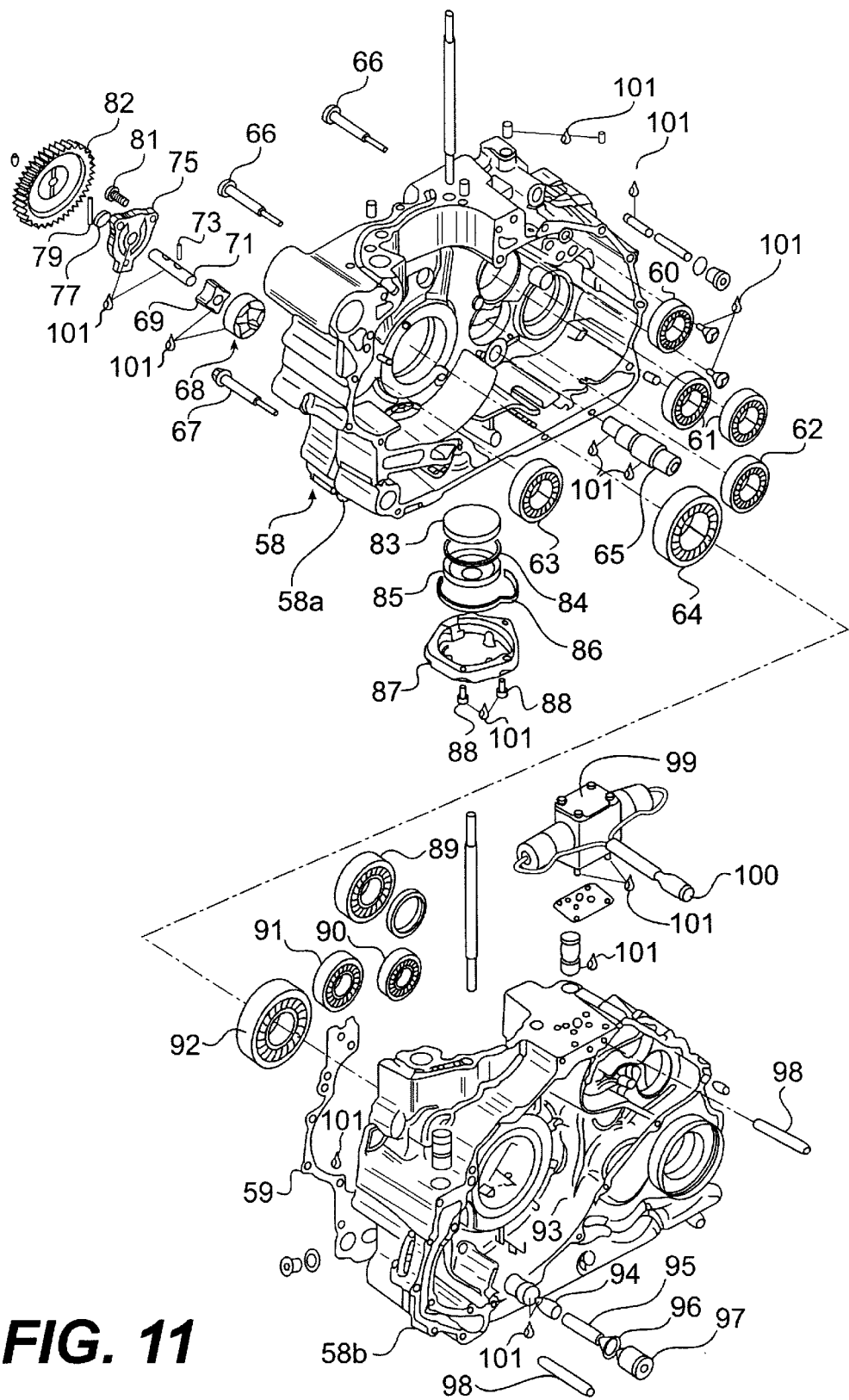
FIG. 11 is an exploded view of the components of the crankcase of the engine of the present invention.

FIG. 11 is a schematic exploded view of the basic components of the crankcase 58 of the present invention. The crankcase consists of two halves marked 58a and 58b. The single cylinder of the engine of the present invention is not shown, however it obviously fits between the two halves 58a and 58b of the crankcase 58 which are fastened together about crankcase gasket 59. There are a number of ball bearings 60, 61, 62 and 63. A roller bearing 64 is also shown. Intermediate gear shaft 65 is shown along with its placement in the crankcase housing. Socket screws 66 and flange hex screws 67 are used to secure the housing together. The oil pump rotor assembly is shown basically as 68 and a rotor is marked as 69. The oil pump shaft is marked as 71. There is a needle pin 73; an oil pump cover 75; a thrust washer 77; needle pin 79; and socket screw 81. The oil pump gear which has 40 teeth is indicated at 82.

At the bottom of the crankcase is an oil sieve 83, an o-ring 84, an oil collector 85, a rubber ring 86 and an oil sieve cover 87. These are secured by hex screws 88 to the bottom of the crankcase housing.

In this particular engine which forms part of the invention, one notes to the left of the crankshaft also within the crankcase housing, a location which houses the transmission. In other words the transmission functions within the crankcase housing 58. The various shafts which rotate within the crankcase such as the cam shaft 42, balance shaft 43, main shaft 52 and other shafts not shown in FIG. 11, however shown in FIG. 10 as 42, 43, 44, 27, 51 , 52, 54 are secured at their ends through ball bearings 89, 90, 91 92. The valve seat sleeve 93 is shown near the bottom of the drawing as well as a valve piston 94 compression spring 95, o-ring 96 and plug screw 97. A pair of cylindrical pins 98 are adapted to pass through the crankcase housing.

Solenoid valve 99 is also shown in FIG. 11 and is adapted to fit on the crankcase housing 58 with solenoid valve gasket 100. Items marked 101 simply indicate lubrication used for the various parts of the crankcase housing.

Figure 12:
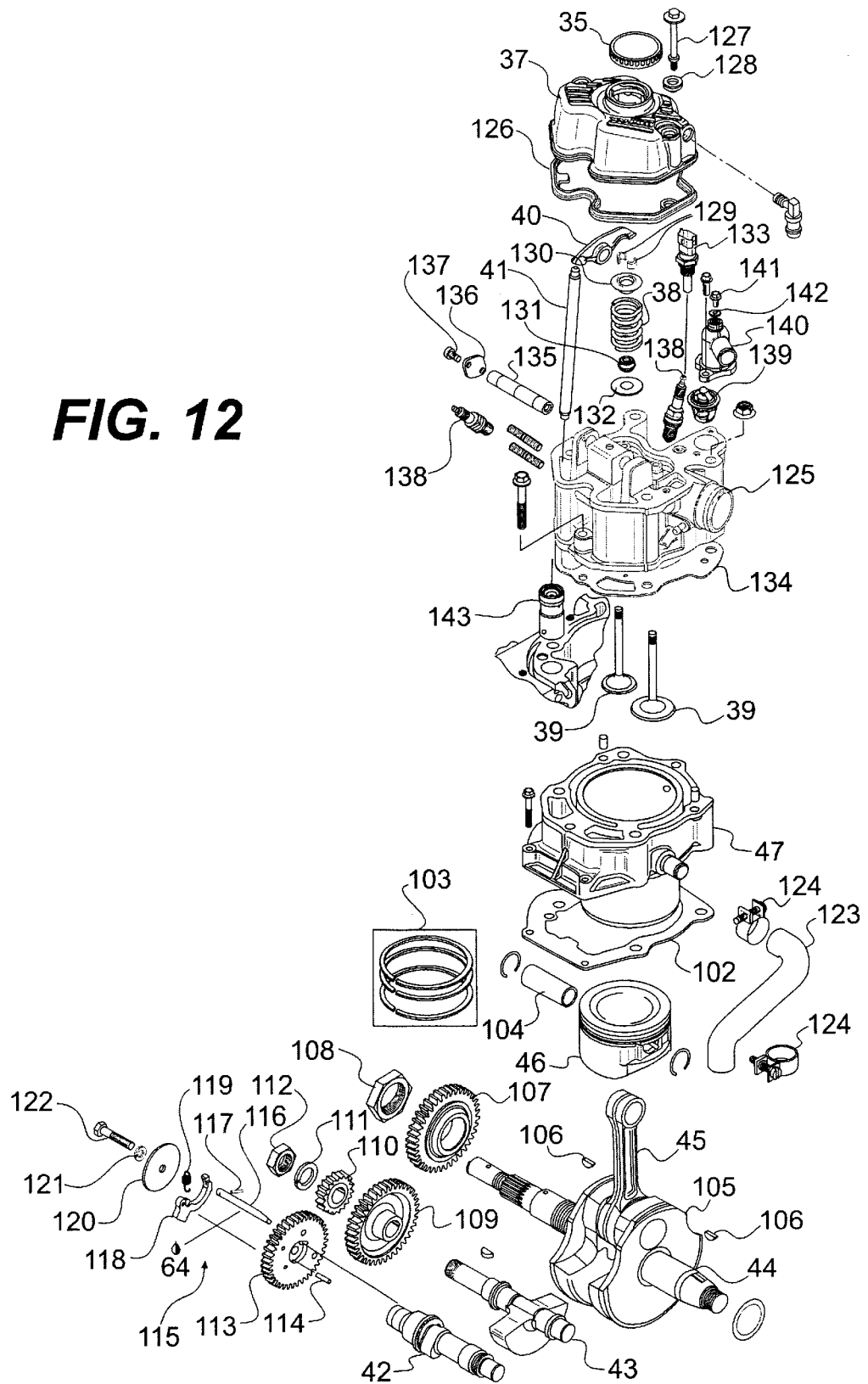
FIG. 12 is an exploded view of the various components of the cylinder and piston of the present invention.

FIG. 12 is a schematic view of the components of the piston and cylinder. The cylinder shown as 47 is fixedly attached with cylinder gasket 102 to crankcase housing. Piston 46 along with piston ring set 103 is attached by piston 104 to a connecting rod 45 which forms part of the crankshaft assembly 105. A woodruff key 106 is used to secure a 42 tooth mating gear 107 to the end of the crankshaft 44 with hex nut 108. Adjacent to crankshaft assembly 105 is balance shaft 43 which is adapted to pass through a balancing shaft gear 109, control gear 110, lock washer 111 and hex nut 112.

Adjacent to balance shaft 43 and generally positioned above the same when installed in the engine is the cam shaft 42 which passes through a cam shaft gear 113 secured by a needle pin 114. The deco shaft assembly 115 has a shaft 116, a groove pin 117, centrifugal weight 118, tension spring 119 followed by a washer 120, block washer 121 and hex screw 122.

A water cooling hose 123 by way of clamps 124 is connected to the cylinder wall and the crankcase housing 58. At the top of FIG. 12, filler cap 35 is found on valve cover 37. Valve cover 37 is attached to cylinder head 125 with valve cover gasket 126, hex screw 127 and rubber bushing 128. Push rod 41 is adapted to move upwardly and downwardly rocker arm 40 which is adapted to move two valves 39. Valve cotter 129, valve spring retainer 130, valve spring 38 and valve seal 131 and washer 132 are inserted on the valves 39. A temperature sensor 133 is adapted to be mounted to the cylinder head 125. Cylinder head gasket 134 is adapted to be placed between the cylinder head 125 and cylinder 47. Rocker arm 40 pivots about rocker arm shaft 135 which is secured by holding strip 136 and a socket screw 137 onto the top of cylinder head 125. The engine of the present invention uses two spark plugs 138 for the single cylinder. Also located on the top of the cylinder head 125 is thermostat 139 which fits within thermostat housing 140 which is secured by hex screw 141 and seal washer 142. The engine is also equipped with a hydraulic valve tap at 143.

In FIG. 13 clutch housing gasket 144 is inserted between clutch housing 145 towards the front of the vehicle to the crankcase 58 (previously shown in FIG. 11). Within the clutch housing 145 is located a first centrifugal clutch to be described later. A disengaging piston shown as 146 is located between the clutch housing 145 and the clutch cover assembly shown as 147. Clutch cover 147 attaches to the clutch housing 145 by means of clutch cover gasket 148.

Of particular interest in the present invention are the water channels shown as 149 which are in both the clutch cover assembly 147 and the clutch housing 145. These water channels move coolant into the bottom of the clutch housing and clutch cover and cool the oil above.

In detail, ball bearings 150 and 151 fit within the clutch housing 145. Flat head screws 152 are shown. On the bottom of the housing is an o-ring 153 and a drain plug 154. Also located at the bottom of the clutch housing 145 is a washer 155 and screw 156. As previously mentioned, the clutch housing gasket 145 is used to seal the clutch housing 145 to the crankcase 58. Hex screws 157, 158 and 159 secure the clutch housing 145 to the crankcase. On the top of clutch housing 145 is an oil filter 36, an oil dipstick 160, and oil filter nipple 161. Between clutch housing 145 and clutch cover 147 are located oil seal 162 and ball bearing 163. There is also a tube 164.

Forward of the clutch cover 147 is ball bearing 165 retaining ring 166 and oil seal 167. A solenoid valve 168 is secured into clutch cover 147 by means of a socket screw 169. A potentiometer 170 with the aid of washer 171 and socket screw 172 is secured to the front end of clutch cover 147.

A pressure valve 173 is also affixed to the outside of clutch cover 147. The oil duct cover 174, which has a gasket 175 is secured by hex screws 176 and washers 177. The cable clip 178 is also inserted on the top of oil duct cover 174. An oil cooler cover 179 is attached by a screw with gasket 180, also on the front end of clutch cover 147. Hex screws 181 and 182 secure clutch cover 147 to clutch housing 145. An oil pressure switch 183 and an oil seal 184 is inserted in the front of clutch cover 147. A speed sensor 185 is secured by hex screw 186. A water cooling hose 397 which leads to cooling channels 149 is secured by clamps 187. Hose clamps 188 and 189 support water cooling hose 397 in position. Hex screws 190 support the clamps.

Figure 14:
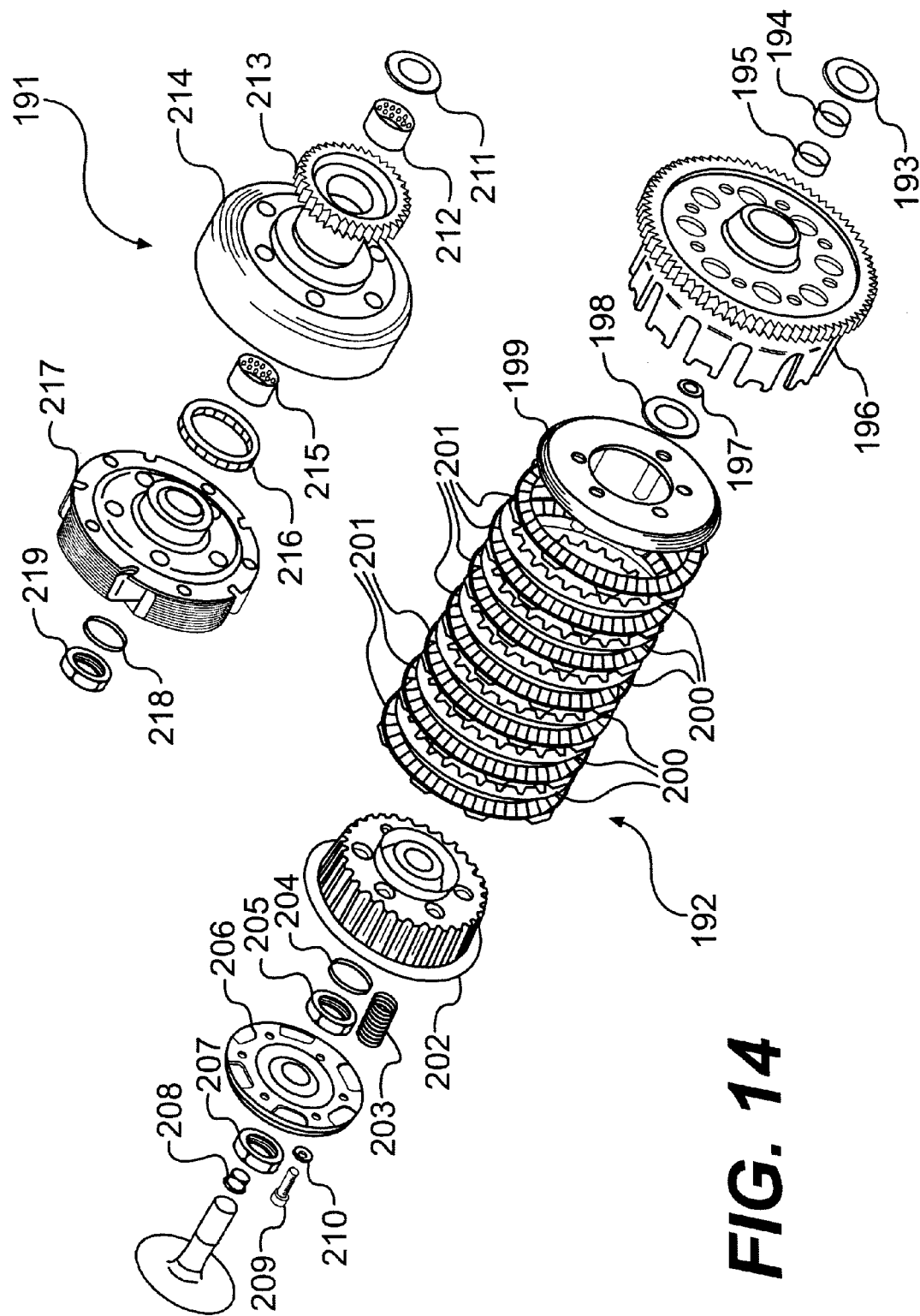
FIG. 14 is an exploded view of the components of the primary clutch and shift clutch.

FIG. 14 illustrates a two clutch system of the present invention which is found between the clutch housing 145 and clutch cover 147. There is a primary centrifugal clutch and a shift clutch. Primary centrifugal clutch 191, shown in the upper right portion in the drawing is connected to the crankshaft 44.

The shift clutch 192 is driven by the centrifugal clutch 191. The shift clutch 192 consist of a thrust washer 193 and needle bearing 192, a needle cage 195 and a clutch drum 196. The clutch drum 196 is equipped with a gear. Thereafter there is an o-ring 197, a thrust washer 198, an inner plate 199 and a plurality of lamella 200 and plates 201. A clutch hub 202 secures the lamella 200 to the inner plate 199 and the clutch drum 196. This is followed by a spring 203, washer 204, hex nut 205, a retaining plate 206, ball bearing 207, and thrust hub 208. All are secured by a hex nut 209 and washer 210.

With regard to the primary clutch 191 which is connected to the crankshaft 44, there is a thrust washer 211, a bushing 212, a gear 213, a clutch assembly 214 comprising a clutch bushing 215, a sprag clutch 216, a clutch hub 217, a serrated washer 218 and a hex nut 219.

Figure 15:
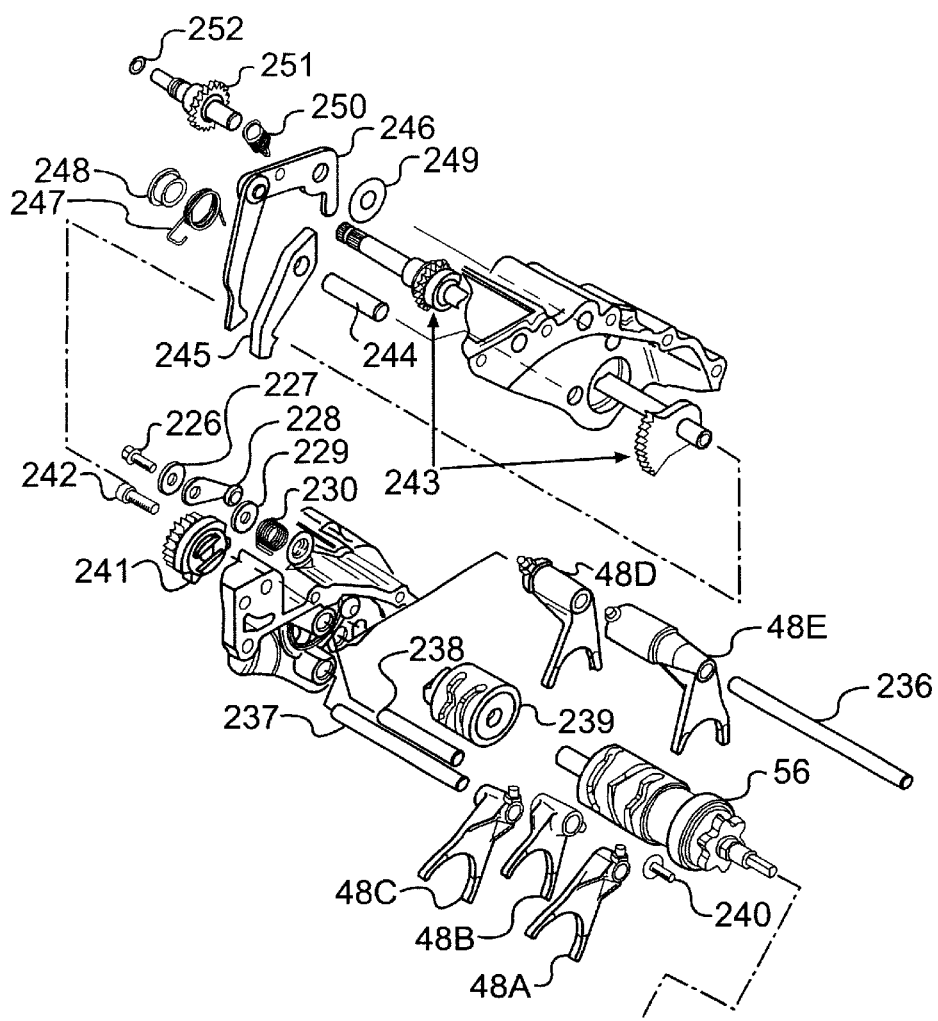
FIG. 15 is an exploded view of the components of the gear shift assembly.
Figure 15:
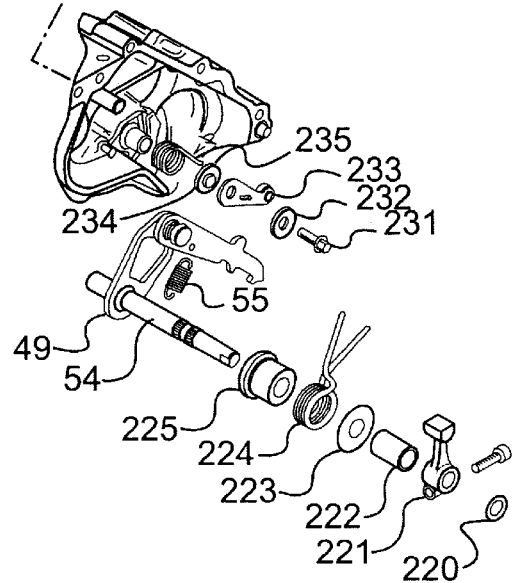

In FIG. 15, the gear shift is shown in an exploded section. The components of the gear shift, although known in the auto industry, particularly the parking gear components have never been used before in an all terrain vehicle. Thus, this forms part of the present invention.

Beginning at the bottom of FIG. 15, there is a thrust washer 210 with a screw and gear shift lever 221, a sleeve 222, a washer 223, a shaft spring 224 and a collar sleeve 225. These are placed on the shift shaft 54 with pawl assembly 49. A tension spring 55 secures them.

To secure the assembly together there is a socket screw 226, a washer 227, an index lever assembly 228, a bushing 229 and an index lever spring 230. On the opposite end there is a socket screw 231, washer 232, index lever assembly 233, bushing 234 and spring 235. There are plurality of shift forks 48a, 48b, 48c, 48d and 48e for the changing of gears. Shift forks 48d and 48e fit on gear shift rod 236 whilst 48a and 48c fit on rod 237 and shift fork 48b fits on rod 238. Also a shift drum assembly 56 and shift 239. Screw 240 secures the assembly together.

At the opposite end of the housing is index gear 241 secured by socket screw 242. The shift shaft assembly is shown as 243. There is a shaft 244, a park locking lever 245 an actuated lever 246, a spring 247, a sleeve 248, a thrust washer 249, tension spring 250, an indicator shaft 251 and o-ring 252.

Figure 16:
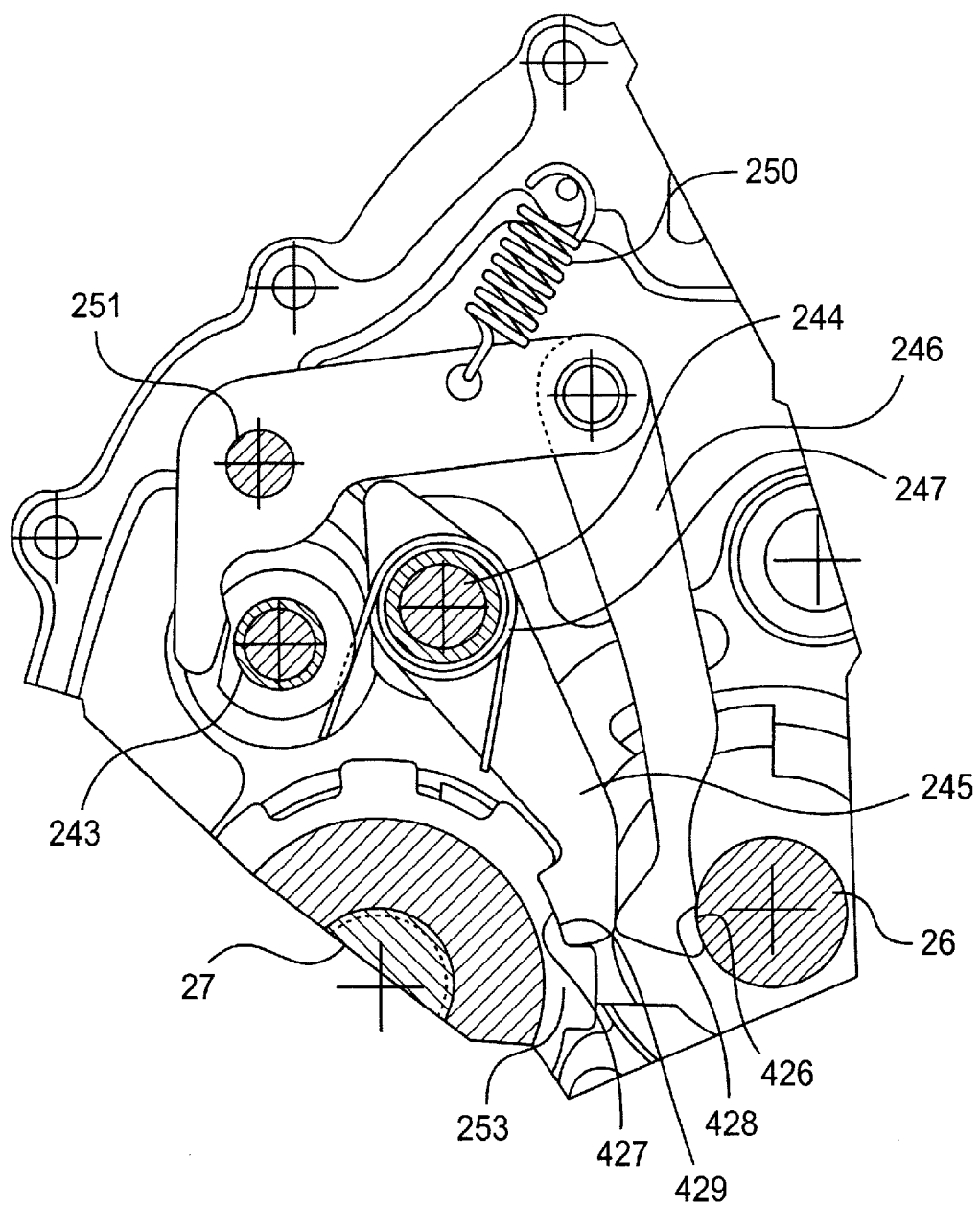
FIG. 16 is a cross section of the components of the parking gear.

FIG. 16 is a cross-section of a cut away close up view of the parking gear assembly. There is the tension spring 250, the shaft 244, the parking lock lever 245, the actuating lever 246 and the helical spring 247. Also shown is front output shaft 26, rear output shaft 27, and a parking gear 253. Also shown is the shift shaft assembly 243 and the indicator shaft 251.

The parking gear assembly is movable between an activated position (as shown in FIG. 16) and a deactivated position. In the activated position, the actuating lever 246 is engaged with the parking lock lever 245 such that respective parking surfaces 426, 427 thereof are engaged with respective surfaces 428, 429 associated with the front and rear output shafts 26, 27 to lock the front and rear output shafts 26, 27 and prevent rotation of the front and rear output shafts 26, 27 with respect to the transmission housing. In the deactivated position, the parking surfaces 426, 427 are disengaged from the surfaces 428, 429 associated with the front and rear output shafts 26, 27 to permit rotation of the front and rear output shafts 26, 27 with respect to the transmission housing.

Figure 17:
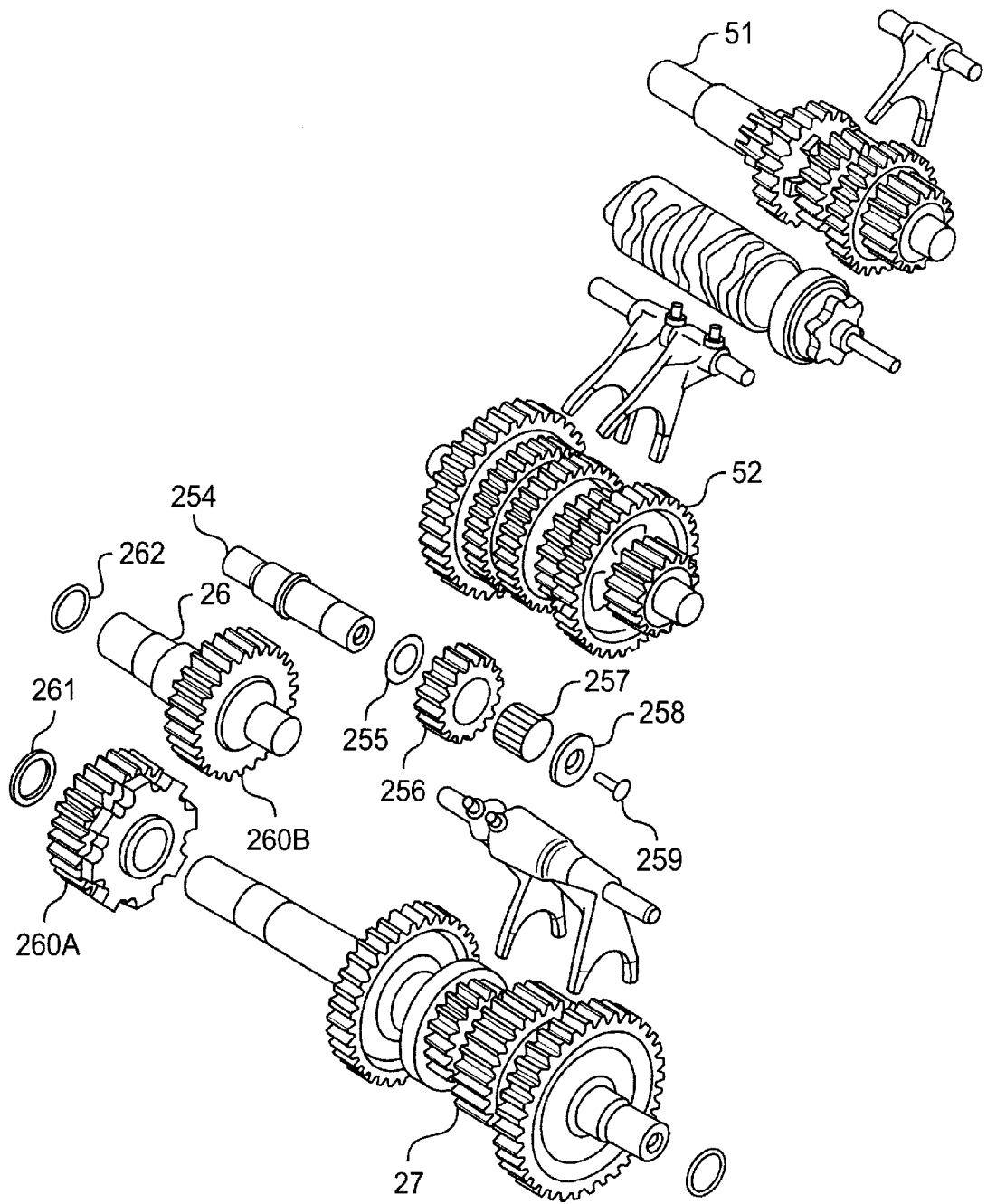
FIG. 17 is a exploded view of the components of the transmission.

Turning to FIG. 17 and as previously mentioned, the components of the transmission are found side by side within the crankcase housing 58. There is the countershaft 51, the main shaft assembly 52, an intermediate gear shaft 254, and a thrust washer 255. Intermediate gear shaft 254 passes through sliding gear 256, needle cage 257, washer 258 and socket screw 259 to secure these components. The rear output shaft 27, which is directed towards the rear axle 22 and rear differential 25 previously described, is attached to output gear 260a and secured by a Circlip 261. The front output shaft 26 is attached to output gear 260b and has o-ring 262 thereon. Front output shaft 26 supplies power to the front axle and the front differential 24, as previously mentioned. As can be seen the five gear forks 48 are present in FIG. 17 as well as the shift drum assembly 56.

Figure 18:
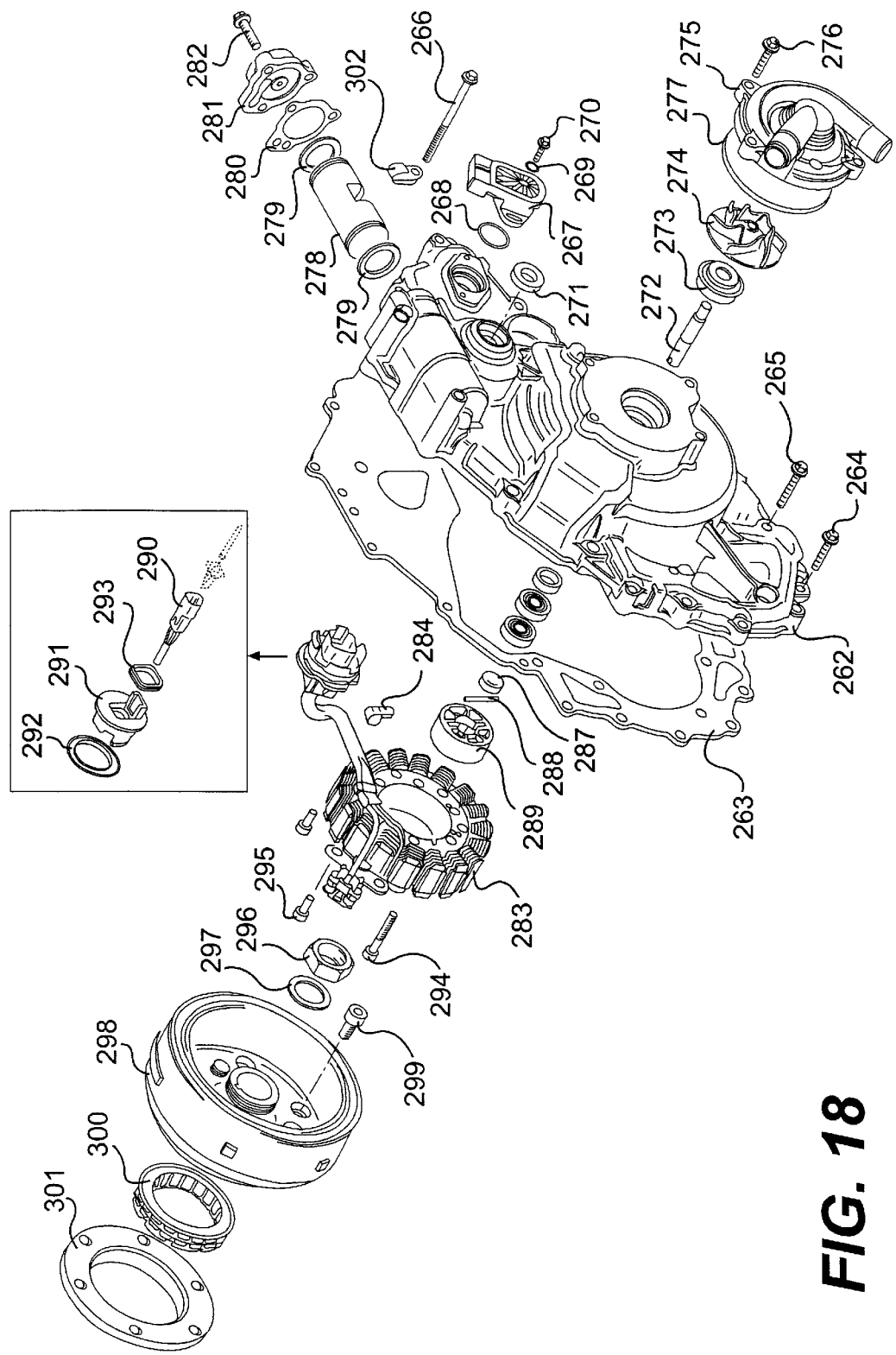
FIG. 18 is an exploded view of the components of the ignition and water pump.

FIG. 18 is an exploded view of the ignition and water pump assembly. The ignition cover 262, by way of ignition cover gasket 263, is secured on the rear of the crankcase 58 shown in FIG. 11, as previously mentioned by means of screws 264, 265 and 266. A potentiometer 267 way of o-ring 268, washer 269 and screw 270 is secured at the rear of the ignition cover 262. An oil seal 271 is also inserted into the rear of ignition cover 262. Connected directly to the crankshaft 44 is water pump shaft 272, oil seal 273, water impeller 274 and water pump housing 275 secured by screw 276.

It is novel to the present invention to have the water impeller 274 and water pump housing 275 directly connected to the ignition cover and driven directly by the crankshaft. A rubber ring 277 seals the impeller to the housing 275. A hydraulic piston 278 is adapted to fit within the ignition cover 262 by means of rings 279, hydraulic cover gasket 280, hydraulic cover 281 and hex screw 282. The magneto assembly 283 is adapted to fit within the ignition cover 262 by means of a clamp 284, a seal 285, a bearing 286, distance sleeve 287, a needle pin 288 and a pawl 289.

The magneto assembly 283 shown in greater detail in the enlarged part of the drawing comprises a female housing of 6 circuits 290, an adapter 291, a gasket 292 and gasket 293. Screws 294 and 295 secure the magneto assembly. Also hex nut 296, washer 297 and a rotor with a sprag clutch assembly 298. This is secured by a socket screw 299. There is a sprag clutch 300 and a sprag clutch housing 301. Cable clamp 302 also secures the magneto assembly.

Figure 19:
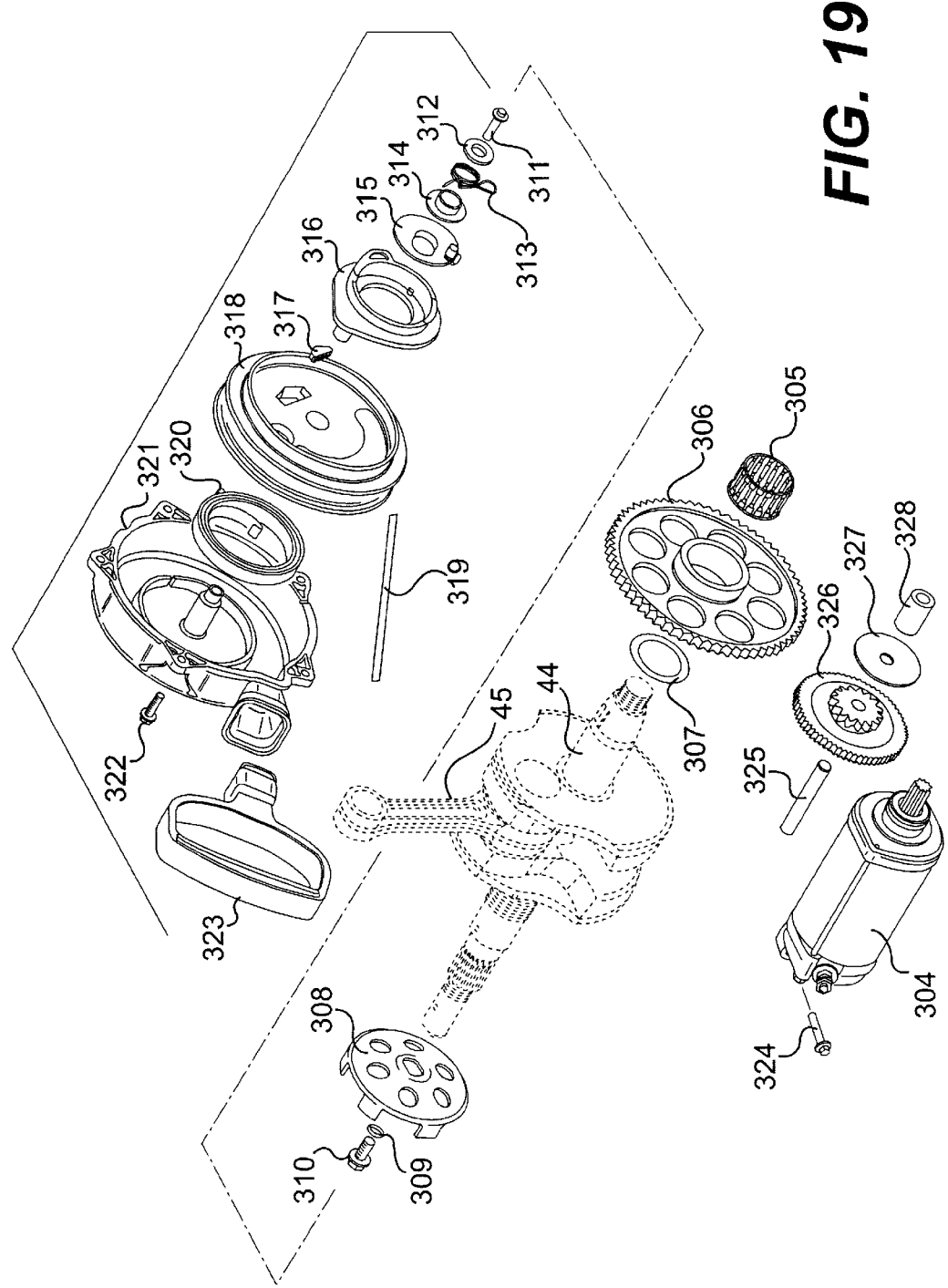
FIG. 19 is an exploded view of the components of the electric and hand starters.

FIG. 19 illustrates a manual starting assembly 303 and an electric start assembly 304. The manual start assembly 303 is located on the end of the crankshaft 44 forward of the clutch cover 147, whereas the electric starting assembly 304 is located close to the crankcase 58. Starting from the rear and progressing forward is a needle cage 305, a ring gear 306, and a ring 307. The crankshaft 44 (as shown in drawings 1 through 10) is shown in dotted lines.

There is a starting pulley 308, an o-ring 309, a hex screw 310, a screw 311, a flat washer 312, a locking spring 313, a stage sleeve 314 and a pawl lock 315. The pawl is marked as 316.

A key clamp 317 is inserted between the pawl 316 and the rope sheave 318. A starter rope 319 is wrapped about the rope sheave 318. A rewind spring 320 (as is in other starters) is inserted within the starter rope housing 321. All is secured by a screw hex 322. The rope 319 once pulled through the housing 321 is attached to a handle starting grip 323 in a normal manner.

Turning to the starting motor, there is a hex screw 324 which secures electric starter assembly 304. A cylindrical pin 325 secures double gear 326 to thrust washer 327 and spacer 328. The electric starter assembly is a typical component and not part of the invention.

Figure 20:
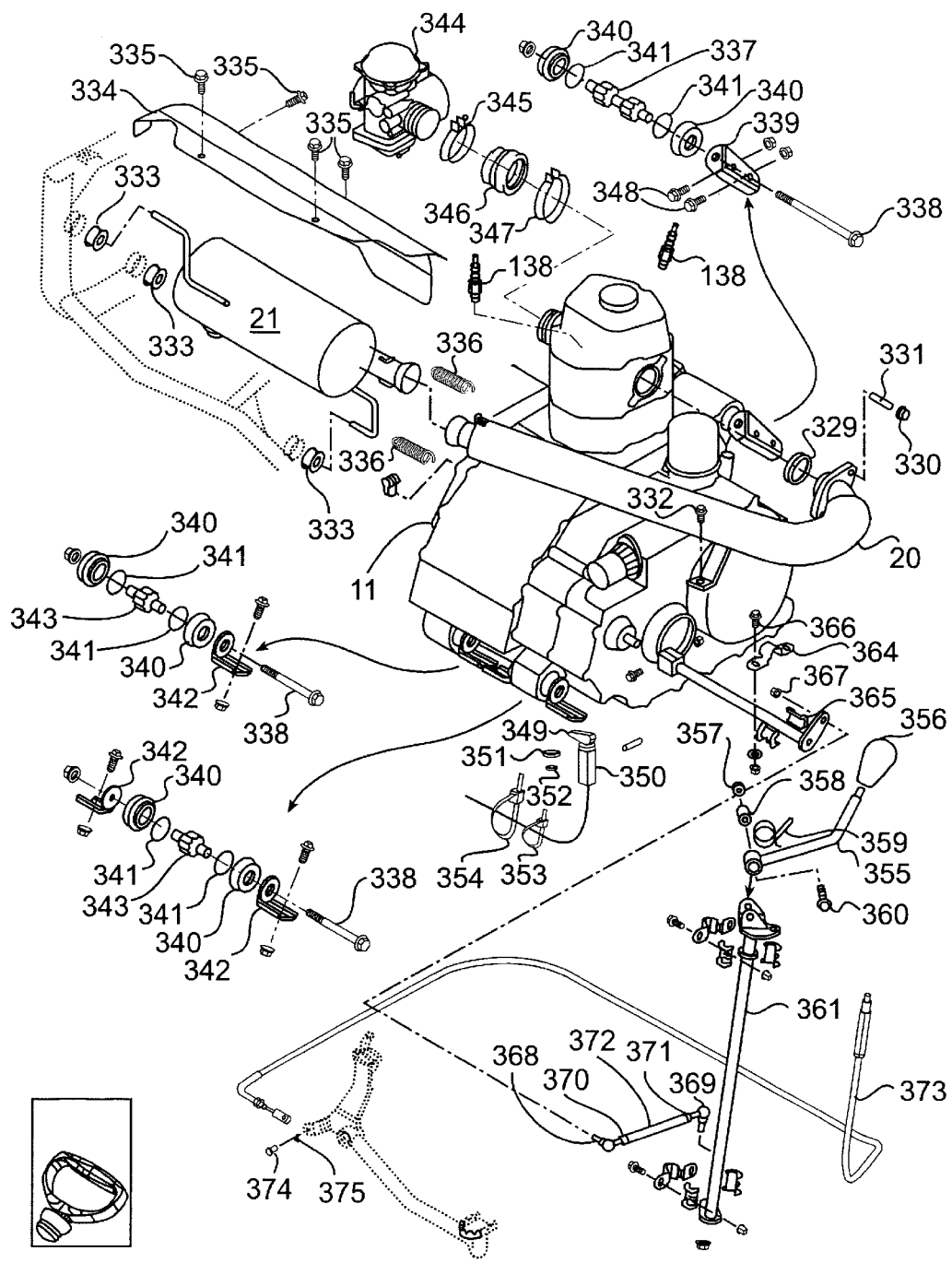
FIG. 20 is an exploded view of the components of the exhaust system.

FIG. 20 is a schematic, exploded view of the components of the exhaust and engine system. The exhaust exits through the front of the engine but is turned directly rearwardly through tuned pipe 20 which is coupled by gasket 329 to the engine. A hex nut 330 by a stud 331 couples the tuned pipe to the engine. Screw 332 secures it to a bracket on the engine. Tuned pipe 20 fits directly into muffler 21. Rubbers 333 are secured to the rear of the frame. A heat shield 334 protects the heat of the muffler from the rest of the vehicle by means of hex screws 335. Springs 336 attach the tuned pipe 20 to the muffler 21. The motor is shown at 11. As previously mentioned, motor 11 has a single cylinder however, it has two spark plugs 138 unique to all terrain vehicles.

Also shown in FIG. 20 is a support bushing 337. This is supported by flanged hex screw 338. Engine bracket 339 is adapted to attach to the frame of the vehicle. By means of hex screw 338 the anti-vibration mount 340 with o-ring 341 support bushing 337 reduces the vibration caused by the engine 14. Similarly engine bracket 342 secured by anti-vibration mounts 340, o-rings 341, and support bushings 343 support the other engine mount. Thus, three engine mounts are shown in FIG. 20. The carburetor 344 is supported on motor 11 at the top of the cylinder by means of clamp 345, carburetor adaptor 346 and clamp 347. Screws 348 are used to secure bracket 339. A choke cable lever 349 is attached to a choke cable 350 by means of a plastic nut 351, lock washer 352 and is secured to the engine by tie raps 353 and 354.

Numeral 355 is the lever assembly. It has a lever button 356, a nylon bushing 357, an aluminum bushing 358 and a lever spring 359, which are secured by a hex screw 360. There is an upper tube 361 and a lower tube 362. Hex flanged screw 363 and clamp retainer 364, along with half ring 365, hex screw 366 and elastic flanged stop 367 secure the assembly together. At the bottom of the assembly is a right hand ball joint 368 and a left band ball joint 369. Hex right hand jam nuts and hex left hand jam nuts 370 and 371 respectively are secured. A tie rod 372 is located between the ball joints 368 and 369. An interlock cable 373 is provided and is secured by clevis pin 374 and cotter pin 375.

Figure 21:
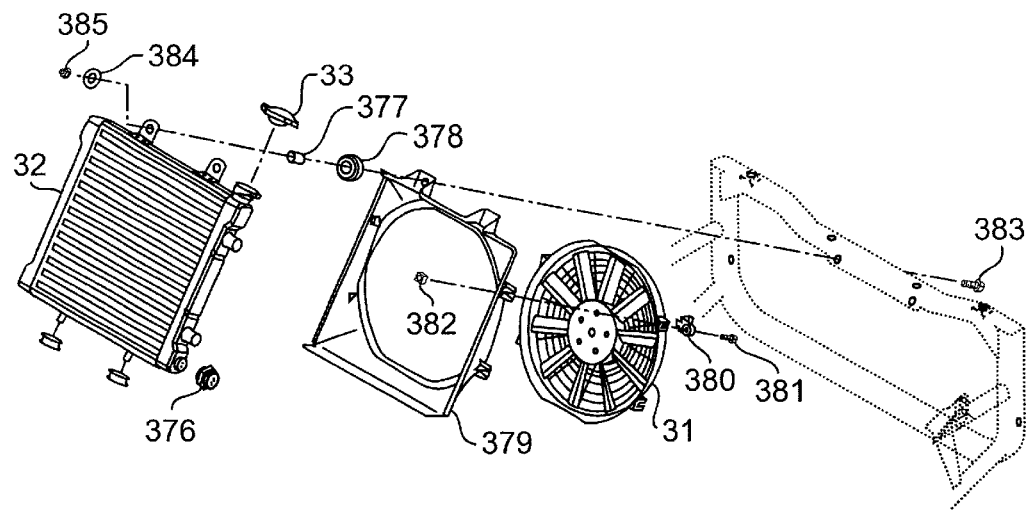
FIG. 21 is an exploded view of the components of the cooling system.
Figure 21:
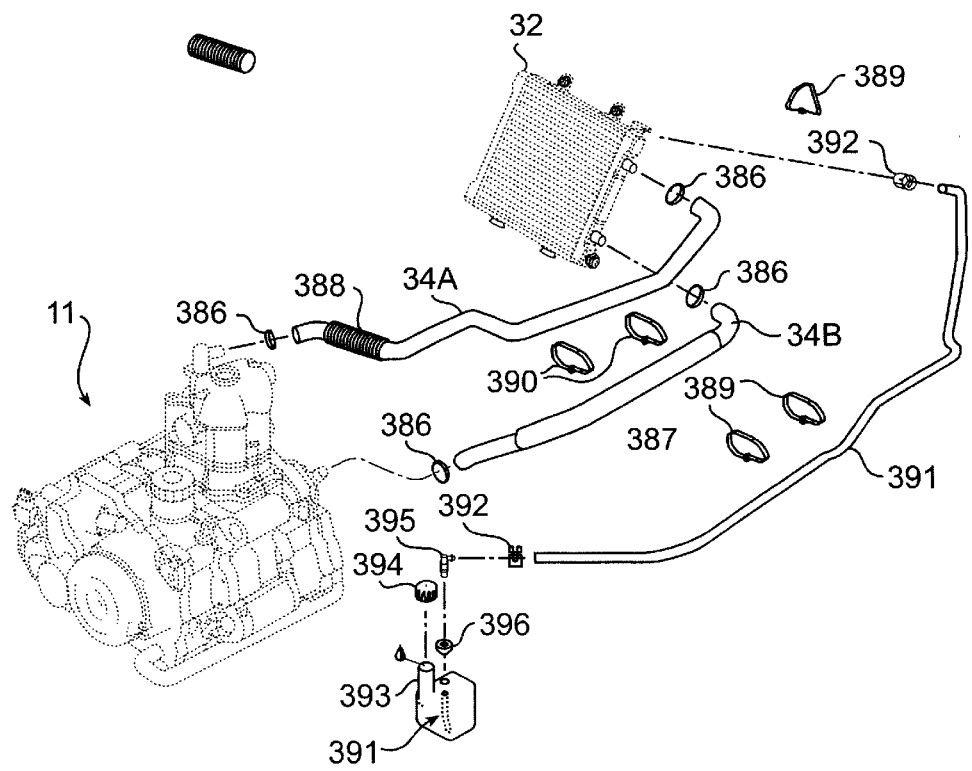

Turning to FIG. 21, this is a schematic view of the components of the cooling system. The principal components are found to the rear of the vehicle behind the motor. The motor is shown in dotted lines and marked as 11. The radiator is marked as 32, it has a temperature sensor 376 located near the bottom of the radiator 32. The radiator 32 is attached to the frame of the vehicle by means of bushings and grommets, 377 and 378 respectively.

Attached to the rear of the radiator is an outlet deflector 379. The fan assembly 31 is attached to the outlet deflector 379 by mean of fan support 380, hex screw 381 and nuts 382. Hex screws 383 attach the radiator 32 and outlet deflector 379 to the frame. Washers 384 and elastic flanged nuts 385 are located at the opposite end of the brackets on the radiator.

The radiator pressure cap is marked 33. The radiator inlet hose 34A runs from the top of the motor 11 to the upper opening of the radiator 32. Clamps 386 secure either end. An outlet radiator hose 34B runs from the bottom of the radiator 32 out to a lower portion of the motor 11 and is clamped in place. The lower hose has a protective shield 387 and the upper hose has a protective shield 388 in case of excess heat. Tie raps 389 and 390 secure the hoses in place. The radiator is also equipped with an overflow meter hose 391 which is secured to a nipple (not shown) on the radiator by means of a clamp 392. The meter hose runs to a coolant tank 393 which has a cap 394 and male connector 395 fits onto meter hose 391 by means of clamp 392 and fits through a grommet 396. The coolant consists of a mixture of antifreeze and water.

Figure 22:
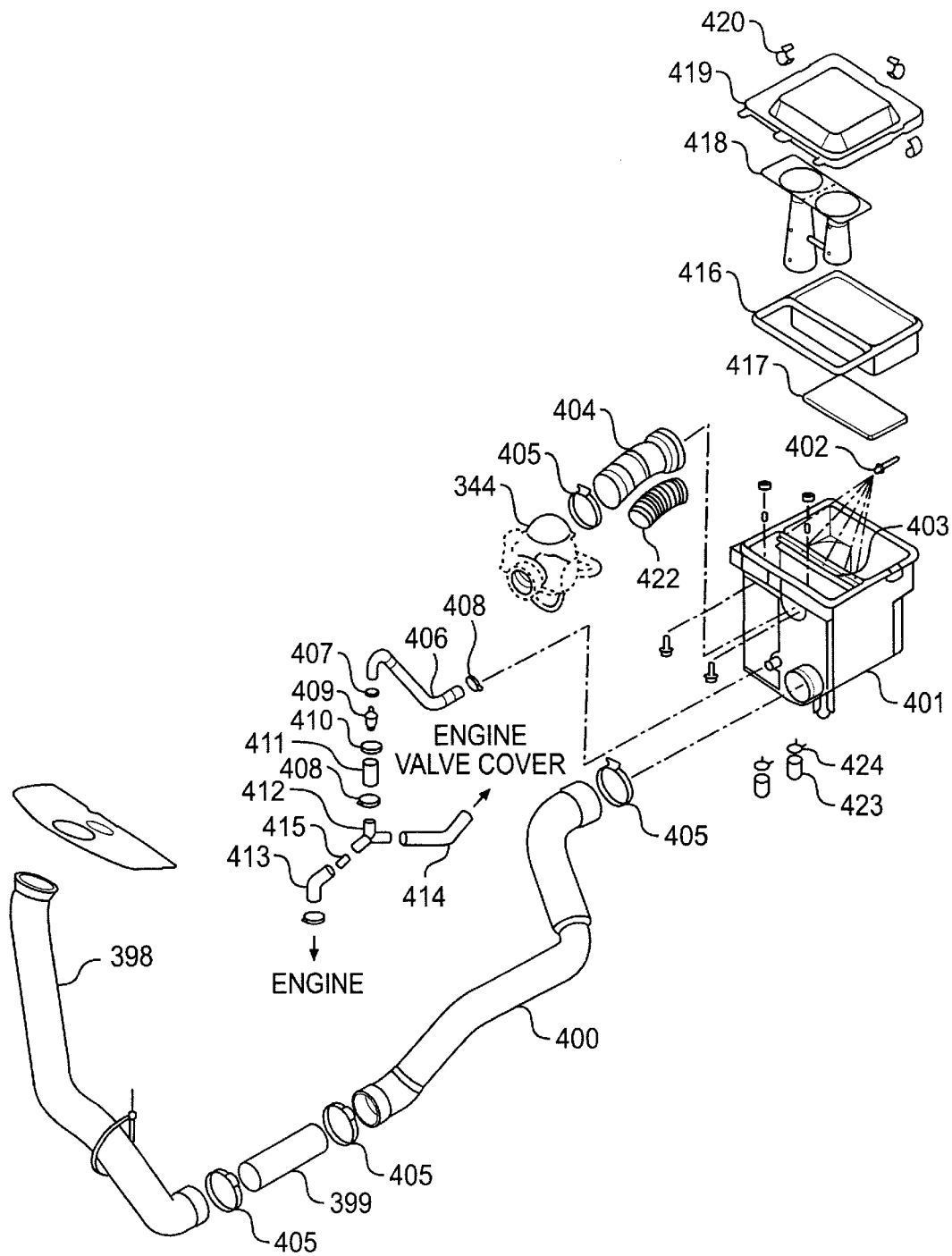
FIG. 22 is an exploded view of the components of the air intake system.

In FIG. 22, the air intake system is shown in schematic view. The air enters at the front of the vehicle at the highest place. This is to eliminate entry of mud or water splashed up from the wheels. The air intake pipes 398, 399 and 400 lead to an air intake silencer or air box 401. Rivets 402 secure the box 401. Internal reinforcement 403 in present. Air from the air box 401 leads through a hose 404 which is held by a clamp 405 to the carburetor 344. Clamps 405 also secure front air intake tube 398 to pipe 399 to pipe 400. Air is moved from the engine valve cover and the engine crankcase by means of vent hose 406, clamps 407 and 408, PCV valve 409, gear clamp oetiker 410, vent hose 411, "Y" fitting 412, hose 413, hose 414 and fitting 415.

An air filter 416 is placed in the air box 401 along with some foam 417. Air intake tubes 418 fit within the air filter 416. A cover 419 is secured by cover bracket 420 to the air box 401. The heat projector 421 is located on the side of the air box 401. Components also include a spring 422, train tube 423 and clip retainer 424.

In summary the present invention contains a number of inventive aspects, all of which will be set forth in the following claims.

The embodiments of the invention in which an exclusive property or privilege is claimed are defined as follows:

1. An all terrain vehicle including a four cycle engine and a power train;

said engine including a crankshaft;

said engine being mounted in said vehicle such that said crankshaft is parallel to a longitudinal axis of said vehicle and parallel to a line of travel when said vehicle is in motion;

said engine further including a rear output shaft and a front output shaft, said shafts being parallel to said crankshaft, wherein said output shafts are in communication with one another by means of gears fixedly attached to said output shafts;

wherein said rear output shaft in operation is adapted to supply power to a rear axle and said front output shaft is adapted to supply power to a front axle.

2. An all terrain vehicle as claimed in claim 1 wherein one of said output shafts is in direct communication with a transmission by means of gears.

3. An all terrain vehicle as claimed in claim 1 wherein said rear output shaft is connected directly to a rear differential gear on said rear axle and said front output shaft is connected directly to a front differential gear;

said shafts being parallel to one another and being positioned along a line which is the shortest distance between said engine and each of said axles.

4. An all terrain vehicle as claimed in claim 1 wherein said output shafts, in operation, rotate at the same speed.

5. An all terrain vehicle as claimed in claim 1 wherein said output shafts in operation rotate at different speeds.

6. An all terrain vehicle as claimed in claim 1 wherein said engine comprises a single cylinder and combustion chamber, said cylinder including a cylinder head and a valve cover, said valve cover including an engine oil filler cap whereby in operation said filler cap is easily accessible to fill said engine with engine oil.

7. An all terrain vehicle as claimed in claim 6 further including gasoline tank, said gasoline tank being positioned on said vehicle remote from said engine.

8. An all terrain vehicle as claimed in claim 6 wherein said cylinder includes two valves and two spark plugs.

9. An all terrain vehicle as claimed in claim 1 wherein said crankshaft is housed within a crankcase;

said crankcase further housing a transmission;

said transmission further comprising a parking gear assembly having a parking surface, said parking gear assembly being movable between (a) an activated position wherein said parking surface is engaged with a surface associated with said front and rear output shafts to lock said front and rear output shafts and prevent rotation of said front and rear output shafts with respect to a transmission housing and (b) a deactivated position wherein said parking surface is disengaged from the surface associated with said front and rear output shafts to permit rotation of said front and rear output shafts with respect to the transmission housing.

10. An all terrain vehicle as claimed in claim 1, said vehicle including a hinged operator's seat, said seat being located substantially above said engine, said seat in an open position permitting free access to most engine components.

11. An all terrain vehicle as claimed in claim 1, wherein the rear output shaft rotates in a first direction that is opposite to a second direction in which the front output shaft rotates.

12. An all terrain vehicle as claimed in claim 1, wherein said vehicle includes a central transverse axis extending transverse to said longitudinal axis, the central transverse axis defining a front portion of the vehicle and a rear portion of the vehicle, said engine being substantially located in rear portion of the vehicle.

13. An all terrain vehicle as claimed in claim 1, wherein the front and rear output shafts are provided on a common lateral side of the crankshaft.

14. An all terrian vehicle including a four cycle engine and a power train;

said engine including a crankshaft;

said engine being mounted in said vehicle such that said crankshaft is parallel to a longitudinal axis of said vehicle and parallel to a line of travel when said vehicle is in motion;

said engine further including a rear output shaft and a front output shaft, said shafts being parallel to said crankshaft, wherein said output shafts are in communication with one another by means of gears fixedly attached to said output shafts;

said rear output shaft in operation is adapted to supply power to a rear axle and said front output shaft is adapted to supply power to a front axle;

wherein said all terrain vehicle further includes a water pump;

said water pump being connected to said crankshaft and rotating at the same speed as said crankshaft when in operation;

said water pump being located to the rear of said engine.

15. An all terrain vehicle including a four cycle engine and a power train;

said engine including a crankshaft;

said engine being mounted in said vehicle such that said crankshaft is parallel to a longitudinal axis of said vehicle and parallel to a line of travel when said vehicle is in motion;

said engine further including a rear output shaft and a front output shaft, said shafts being parallel to said crankshaft, wherein said output shafts are in communication with one another by means of gears fixedly attached to said output shafts;

said rear output shaft in operation is adapted to supply power to a rear axle and said front output shaft is adapted to supply power to a front axle;

wherein said power train includes a centrifugal clutch connected to said crankshaft and a shift clutch;

said centrifigal clutch being housed between a clutch housing and a clutch cover.

16. An all terrain vehicle including an engine and a power train;

said engine including a crankshaft;

said engine being mounted in said vehicle such that said crankshaft is parallel to a longitudinal axis of the vehicle and parallel to a line of travel when said vehicle is in motion;

said engine further including at least one output shaft that is parallel to said crankshaft;

wherein the at least one output shaft in operation is adapted to supply power to a rear axle and a front axle;

wherein said crankshaft is housed within a crankcase;

said crankcase further housing an entire transmission;

said transmission further comprising a parking gear assembly having a parking surface, said parking gear assembly being movable between (a) an activated position wherein said parking surface is engaged with a surface associated with the at least one output shaft to lock the at least one output shaft and prevent rotation of the at least one output shaft with respect to the crankcase, in which said entire transmission is housed and (b) a deactivated position wherein said parking surface is disengaged from the surface associated with the at least one output shaft to permit rotation of the at least one output shaft with respect to the crankcase.

17. An all terrain vehicle as claimed in claim 6, wherein said vehicle includes a central transverse axis extending transverse to said longitudinal axis, the central transverse axis defining a front portion of the vehicle and a rear portion of the vehicle, said engine being substantially located in the rear portion of the vehicle.

18. An all terrain vehicle including an engine and a power train;

said engine including a crankshaft;

said engine being mounted in said vehicle such that said crankshaft is parallel to a longitudinal axis of said vehicle and parallel to a line of travel when said vehicle is in motion;

said engine further including a front output shaft defining a first axis and a rear output shaft defining a second axis parallel to and spaced from the first axis, said front and rear output shafts being parallel to said crankshaft and positioned on one common side of the crankshaft;

wherein said rear output shaft in operation is adapted to supply power to a rear axle and said front output shaft is adapted to supply power to a front axle.

19. An all terrain vehicle as claimed in claim 18, wherein said vehicle includes a central transverse axis extending transverse to said longitudinal axis, the central transverse axis defining a front portion of the vehicle and a rear portion of the vehicle, said engine being substantially located in the rear portion of the vehicle.

20. An all terrain vehicle as claimed in claim 18, wherein the front and rear output shafts are connected by means of gears.

* * * * *

UNITED STATES PATENT AND TRADEMARK OFFICE
CERTIFICATE OF CORRECTION

PATENT NO. : 6,296,073 B1
DATED : October 2, 2001
INVENTOR(S) : Rioux et al.

It is certified that error appears in the above-identified patent and that said Letters Patent is hereby corrected as shown below:

<u>Title page,</u>
Item [56], please insert:
-- [56] 5,515,940      *      5/1996   Shichinohe, et al. ................. 180/376
       5,558,059      *      9/1996   Yoshinaga, et al. ................ 123/198 E
       5,636,608      *      6/1997   Shichinohe, et al. ............... 123/197.1
       4,719,819      *      1/1988   Tsutsumikoshi, et al. .............. 74/745
       4,722,235      *      2/1998   Kumazawa......................... 74/15.66
       4,736,809      *      4/1988   Kumazawa...................... 180/75.17
       4,915,070      *      4/1990   Okui...............................123/196 R FOREIGN PATENT DOCUMENTS
    CA               2,153,721         1/1996
    JP               62-110528        5/1987
    JP               2-112622         4/1990 --

Signed and Sealed this

Eleventh Day of March, 2003

JAMES E. ROGAN
*Director of the United States Patent and Trademark Office*